United States Patent [19]

Dundics et al.

[11] Patent Number: 4,941,113

[45] Date of Patent: Jul. 10, 1990

[54] COMPUTER MONITORING AND TESTING OF AUTOMATIC CONTROL SYSTEM

[76] Inventors: Marton J. Dundics, 2448 Holly Ave., Suite 200, Annapolis, Md. 21401; Robert S. Bradlee, 2551 Eltham Ave., Suite L, Norfolk, Va. 23513

[21] Appl. No.: 206,495

[22] Filed: Jun. 15, 1988

[51] Int. Cl.[5] .......................... G06F 15/46; G06F 9/00

[52] U.S. Cl. .................................. 364/551.01; 73/112; 364/494; 364/900

[58] Field of Search ............... 364/492, 494, 495, 578, 364/579, 500, 551.01, 200, 900; 340/721; 73/112

[56] References Cited

U.S. PATENT DOCUMENTS

| | | | |
|---|---|---|---|
| 3,800,288 | 3/1974 | Russell et al. | 364/200 |
| 4,368,520 | 1/1983 | Hwang et al. | 364/494 |
| 4,396,977 | 8/1983 | Slater et al. | 364/500 |
| 4,427,896 | 1/1984 | Waldron | 364/495 |
| 4,628,462 | 12/1986 | Putman | 364/494 |
| 4,701,861 | 10/1987 | Kauke | 364/500 |
| 4,707,778 | 11/1987 | Yamada et al. | 364/494 |
| 4,802,100 | 1/1989 | Aasen et al. | 364/494 |
| 4,805,114 | 2/1989 | Putman et al. | 364/494 |

*Primary Examiner*—Kevin J. Teska

*Attorney, Agent, or Firm*—Lane, Aitken & McCann

[57] ABSTRACT

A computer system tests and monitors a pneumatic control system designed to automatically control steam boilers. Transducers are provided which measure the pneumatic pressures in the pneumatic control system as well as some of the parameters in the boiler system itself. These transducers convert the sensed values to digital values and can be read by a computer every tenth of a second. The computer operates and is controlled by a touch sensitive display and is programmed to provide directions on the screen to lead an operator through each of the series of the series of test steps necessary to evaluate the various components of the pneumatic control system. In addition, the system continuously monitors the various parameters of the system and through control of the touch sensitive display, the operator can have displayed to him the various parameters of the system. In addition, the system is operable to continuously monitor the sensed parameters of the system to determine whether any of the sensed parameters values are outside of specification values and to indicate to the operator which parameters are at fault. In addition, the operator through the system of the invention can select and be lead through a flex test for the boiler. In this test, all of the parameters are read at one tenth of a second intervals and can be compared in a statistical analysis against a mathematical model to obtain a figure of merit for the operation of the major components of the pneumatic control system.

7 Claims, 15 Drawing Sheets

FIG. 10

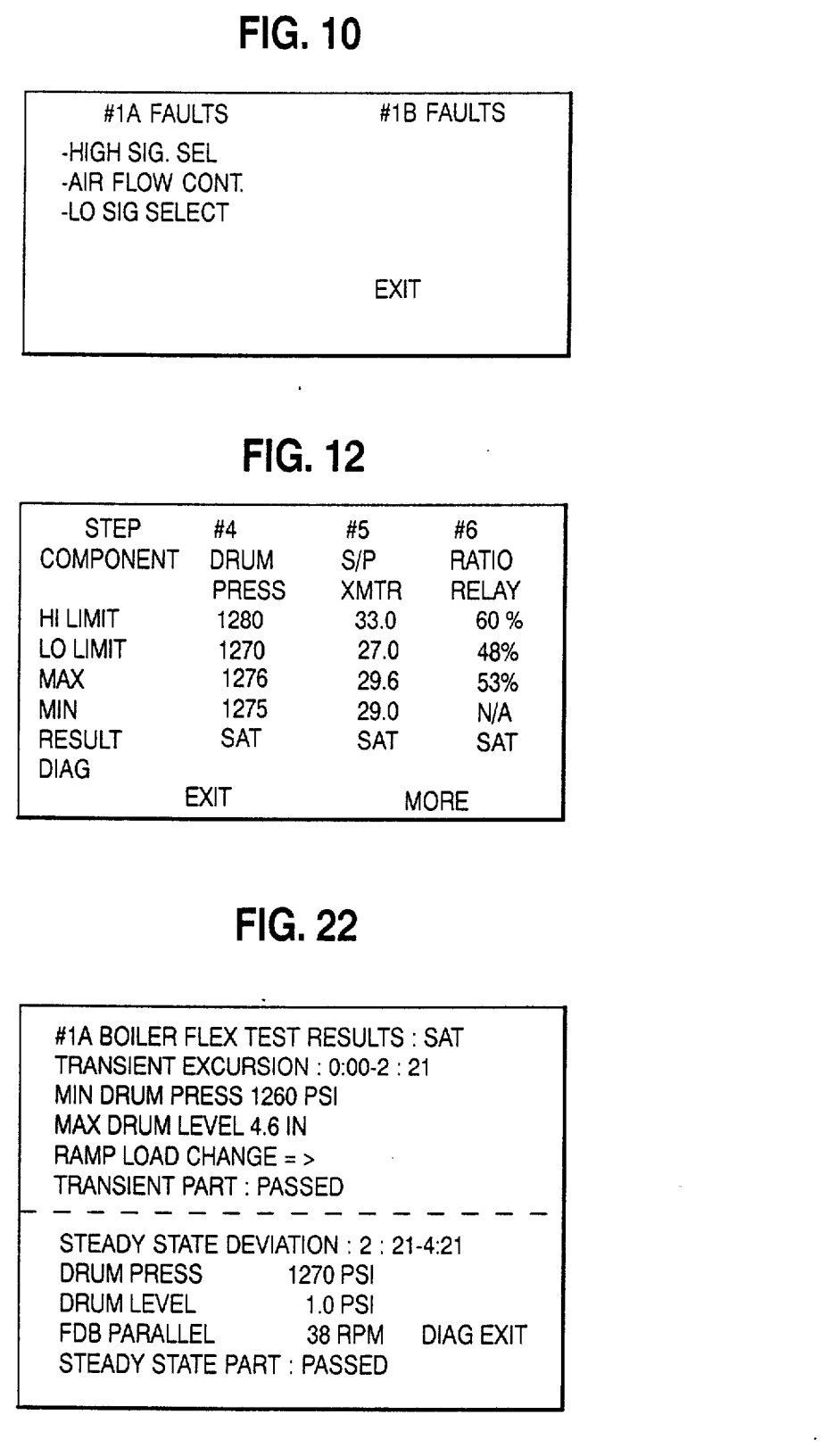

| #1A FAULTS | #1B FAULTS |
|---|---|
| -HIGH SIG. SEL | |
| -AIR FLOW CONT. | |
| -LO SIG SELECT | |
| | EXIT |

FIG. 12

| STEP | #4 | #5 | #6 |
|---|---|---|---|
| COMPONENT | DRUM PRESS | S/P XMTR | RATIO RELAY |
| HI LIMIT | 1280 | 33.0 | 60 % |
| LO LIMIT | 1270 | 27.0 | 48% |
| MAX | 1276 | 29.6 | 53% |
| MIN | 1275 | 29.0 | N/A |
| RESULT | SAT | SAT | SAT |
| DIAG | | | |
| | EXIT | | MORE |

FIG. 22

#1A BOILER FLEX TEST RESULTS : SAT
TRANSIENT EXCURSION : 0:00-2 : 21
MIN DRUM PRESS 1260 PSI
MAX DRUM LEVEL 4.6 IN
RAMP LOAD CHANGE = >
TRANSIENT PART : PASSED

---

STEADY STATE DEVIATION : 2 : 21-4:21

| | | |
|---|---|---|
| DRUM PRESS | 1270 PSI | |
| DRUM LEVEL | 1.0 PSI | |
| FDB PARALLEL | 38 RPM | DIAG EXIT |

STEADY STATE PART : PASSED

--FLEX TEST DIAGNOSTICS--

| UNIT | MERIT | RANKING |
|---|---|---|
| STM PRESS CONT. | 0.92 | SAT |
| AIR FLOW CONT. | 0.86 | SAT |
| FEED FLOW CONT. | 0.88 | SAT |
| STM. RATE RELAY | 0.91 | SAT |
| CHAR. RELAY | 0.99 | SAT |
| RATIO RELAY | 0.92 | SAT |
| RANGE MODIFIER | 1.00 | SAT |
| COMB RELAY | 0.98 | SAT |
| | | CONTINUE |

COMPUTER MONITORING AND TESTING OF AUTOMATIC CONTROL SYSTEM

This invention relates to computer monitoring and testing automatic control systems and more particularly to a system for monitoring and testing a pneumatic system for automatically controlling the operation of steam boilers.

BACKGROUND OF THE INVENTION

In steam driven ship propulsion systems, oil fired burners furnish variable and controlled amounts of steam to the propulsion system through a steam throttle. Typically, the boilers are controlled automatically by a pneumatic control system, which responds to the steam pressure in the boiler drum, the rate of steam flow through the steam throttle, the rate of feedwater flow to the boiler drum, and the water level in the boiler drums to automatically control the fuel oil valves furnishing fuel oil to the burners, feedwater valves furnishing water to the drums and forced draft burners furnishing air to the burners. Because the components of the pneumatic control system are interrelated and perform in a cascading mode, misalignment malfunction or degradation in the operating characteristics of the components of the system can cause total degradation without any clear indication as to which component, is causing the problem. Currently, on naval vessels to maintain satisfactory operation of a pneumatic system, a series of tests, called on-line verification tests, have been designed to test the performance of the various components of the pneumatic control system, each test involving a series of different steps performed manually by the operator, and the operator manually reading and recording gauges, and comparing the gauge readings with standard values. In addition, to the online verification procedures which are described in detail in a manual, the boiler is tested periodically by what is described as a flex test in which the performance of the control system is evaluated by operating the steam throttle to increase or decrease the fuel pressure to the burners by 70%.

SUMMARY OF THE INVENTION

In accordance with the present invention, the testing and the monitoring of the pneumatic control system is performed in a much more expeditious manner. In the system of the invention, transducers are provided which measure the pneumatic pressures in the pneumatic control system as well as some of the parameters in the boiler system itself. These transducers convert the sensed values to digital values and can be read by a computer every tenth of a second. The computer operates and is controlled by a touch sensitive display and is programmed to provide directions on the screen to lead an operator through each of the series of the series of test steps necessary to evaluate the various components of the pneumatic control system. In addition, the system continuously monitors the various parameters of the system and through control of the touch sensitive display, the operator can have displayed to him the various parameters of the system. In addition, the system is operable to continuously monitor the sensed parameters of the system to determine whether any of the sensed parameter values are outside of specification values and to indicate to the operator which parameters are at fault.

In addition, the operator through the system of the invention can select and be lead through a flex test for the boiler. In this test, all of the parameters are read at one tenth of a second intervals and can be compared in a statistical analysis against a mathematical model to obtain a figure of merit for the operation of the major components of the pneumatic control system.

By means of the present invention, the pneumatic control system can be tested much more expeditiously and thus, maintenance of the system is greatly facilitated.

BRIEF DESCRIPTION OF THE DRAWINGS

FIGS. 9 and 10 illustrate samples of the screen displayed by the system of the invention when operating in the continuous on-line verification mode of operation.

FIG. 12 illustrates a display created on the screen during the on-line verification test of FIG. 11.

FIG. 21 is a flowchart illustrating the routine for performing the boiler flex test on the pneumatic control system by the system of the present invention;

FIGS. 22 and 23 illustrate examples of display screens generated by the routine of FIG. 21.

DESCRIPTION OF A PREFERRED EMBODIMENT

Figure 1:
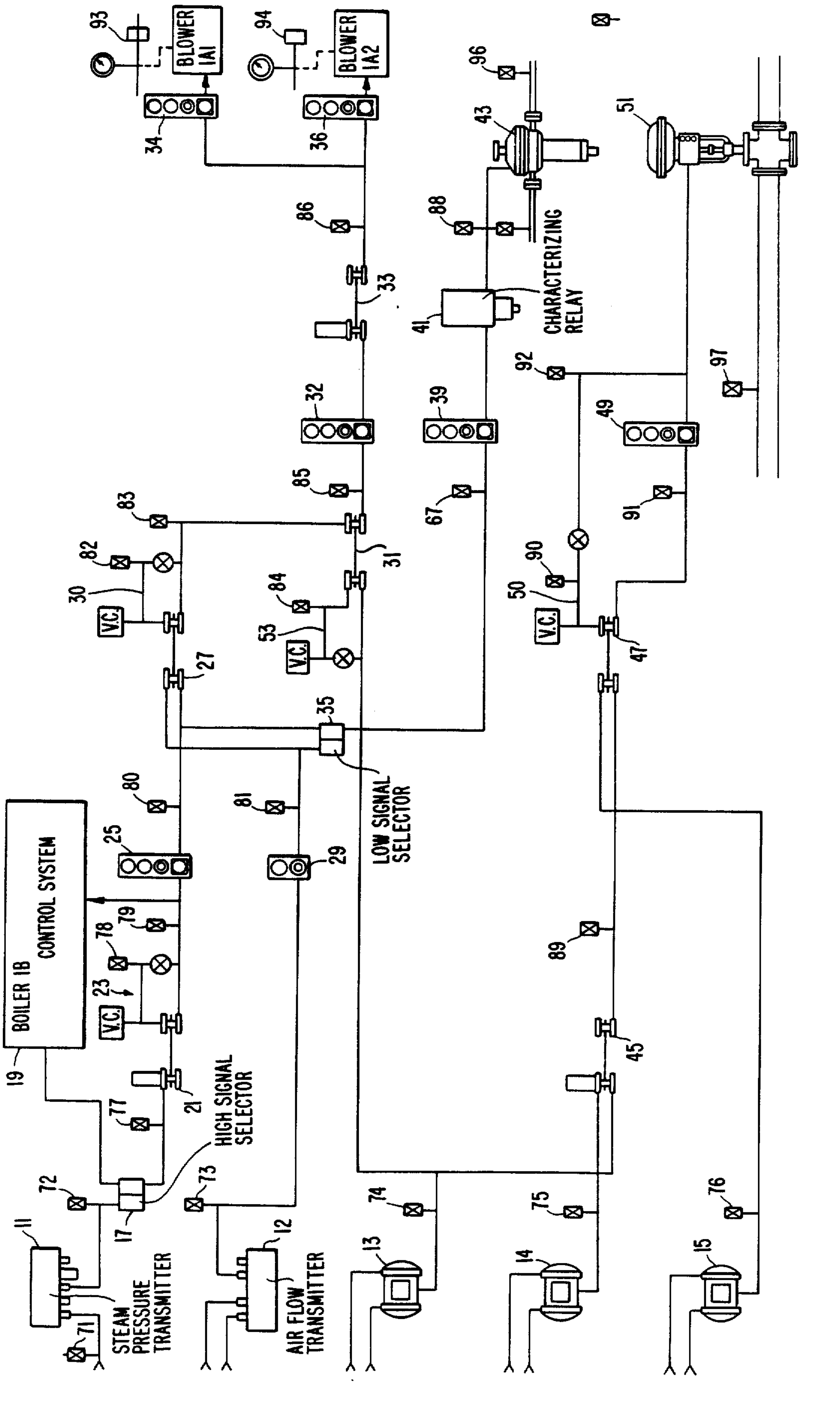
FIG. 1 illustrates the pneumatic boiler control system to which the testing and monitoring system of the present invention is applicable.

The automatic pneumatic control system to which the management support system of the present invention is applicable is illustrated in FIG. 1. This pneumatic control system operates to automatically control the operation of the pair of boilers 1A and 1B, furnishing steam to a turbine, which in this specific embodiment, drives a ship's propellers to provide ship's force. The pneumatic system functions to automatically control the fuel oil pressure to the burners of the boiler and the rate of feedwater flow to the boilers to automatically maintain the steam pressure within the boilers, called the "drum pressure", at 1250 PSI and to maintain the water level in the drum, called the "drum level", at a desired value called normal In addition, the system automatically controls forced draft blowers 1A1 and 1A2 for the boiler 1A, 1B1 and 1B2 for the boiler 1B, to correspond to the rate that the boilers 1A and 1B are being fired In FIG. 1, the details of the system for one boiler, designated the boiler 1A, are illustrated. A duplicate system is provided for the other boiler 1B except for certain components of the control system illustrated in FIG. 1, which are common to both boilers. The system for one of the two boilers as shown in FIG. 1 comprises a steam pressure transmitter 11 which senses the drum pressure of the boiler and produces a pneumatic output signal representing the drum pressure, an air flow transmitter 12 which senses the air flow generated by the forced draft blowers for the boiler and generates a pneumatic output signal representing this rate of air flow, a steam flow transmitter 13 which senses the rate of steam flow and generates a pneumatic signal representing the rate of steam flow, a feed water flow transmitter 14 which senses the rate of feed water flow to the boiler and generates a pneumatic signal representing the rate of feed water flow to the boiler, and a drum level transmitter 15 which generates a pneumatic signal representing the level of water in the boiler drum.

The pneumatic signal generated by the steam pressure transmitter 11 is applied to a high signal selector 17 which also receives a corresponding signal from the steam pressure transmitter for the other boiler 1B identical to the transmitter 11. The steam pressure transmitter for the boiler 1B is part of the boiler 1B control system illustrated as block 19 in FIG. 1. The high signal selector 17 selects the highest pneumatic signal from the two applied signals and produces a pneumatic output signal corresponding to the higher one of the two applied input signals. This output signal is applied to a pneumatic controller 21, which is one of several such pneumatic controllers employed in the pneumatic control system. Each pneumatic controller of this system has a positive input, an inverting input, a summing input and an output The pneumatic signal generated at the output can be expressed by the following formula $S+K(P-N)$, wherein S is the pressure applied to the summing input, P is the pressure applied to the positive input, N is the pressure applied to the inverting input, and K is the gain characteristic of the controller. With no signal difference between the signals applied to the positive and inverting inputs, the pneumatic controller will produce a pneumatic signal at its output equal to the pneumatic signal applied to its summing input, and will increase or decrease its pneumatic output signal from the summing input signal value in accordance with the difference between the input signals applied to the positive and inverting inputs.

The pneumatic controller 21, which is called the "steam pressure controller" in the pneumatic system shown in FIG. 1, receives the signal from the high signal selector 17 at its inverting input, and a constant spring pressure corresponding to 30 PSI is applied to the positive input. The output from the controller 21 is connected to a reset circuit 23, which integrates the output signal and applies the integrated output signal, called the "reset signal", to the summing input of the controller 21. As a result, a pneumatic signal applied to the inverting input of the controller 21 of greater than 30 PSI will cause the output pneumatic signal from the controller 21 to drop below the reset signal and a pneumatic input signal applied to the inverting input of the controller 21 of less than 30 PSI will cause the pneumatic output signal from the controller 21 to increase above the reset value. When the output signal from the pneumatic controller 21 increases or decreases from the reset value, this change will be integrated and applied back to the summing input so that the controller 21 will maintain an increased or decreased value at its output even though the signal applied to the inverting input changes back to equal the constant pressure signal applied to the positive input. In this manner the reset circuit resets the output signal of the controller in accordance with instantaneous variations in the input signal.

The high signal selector 13 and the steam pressure controller 21 with its reset circuit 23 are common to the pneumatic control system for each of the two boilers 1A and 1B. Accordingly, the output signal from the steam pressure controller 21 is fed to the pneumatic control system 19 for the boiler 1B as well as to an automatic/-manual station 25, called the boiler master, in the pneumatic control system for the boiler 1A. Since the pneumatic control system 19 is identical and duplicates the corresponding system for the boiler 1A, the output signal from the steam pressure controller 21 will go to a boiler master in the pneumatic control system 19 just like the boiler master 25. The boiler master 25 is selectively operable to exert manual control over the pneumatic signal at this point in the system. When the boiler master 25 is set to automatic, it will transmit the applied input pneumatic signal to the pneumatic output line from the station. When the boiler master 25 is set to manual, the pneumatic output signal from the boiler master 25 will be a value selected manually at the boiler master 25. The output signal from the boiler master 25 is applied to the positive input of a pneumatic controller 27, called the "air flow controller", which also receives the output pneumatic signal from the fuel-air ratio relay 29. The pneumatic output signal from the air flow transmitter 12 representing the rate of air flow from the blowers is applied to the fuel-air ratio relay 29, which generates an output signal which is a predetermined multiple of the input signal and this pneumatic output signal is applied to the inverting input of the air flow controller 27. The air flow controller 27 will generate an output signal corresponding to the difference of the two applied signals. The output of the air flow controller 27 is provided with a reset circuit 31 which will reset the value of the output signal in accordance with the integral of the output signal. The output signal of the air flow controller 27 is applied to the summing input of the pneumatic controller 31, called the "steam flow rate relay", which receives at its positive input, the pneumatic output signal from the steam flow transmitter 13 representing the rate of steam flow as a feed forward signal. The feed forward signal from the steam flow transmitter is also integrated by circuit 53 and the integral is applied to the inverting input of the pneumatic controller 31. Accordingly, the air flow controller 27 will produce a pneumatic output signal which is varied up and down in accordance with the difference between the output signal of the steam pressure controller 21 and the fuel-air ratio relay 29 and the steam flow rate relay 31 will produce an output signal corresponding to the output signal of the air flow controller 27. This output signal will be varied up and down from the value of the signal signal output of the air flow controller 27 in accordance with instantaneous variations in the feed forward signal applied from the steam flow transmitter 13, the integrating circuit 53 having the effect of the cancelling out long term changes in the feed forward signal. The output signal from the steam flow rate relay 31 is applied through an automatic/manual station 32, called the "forced draft blower master", to a pneumatic controller 33, which has a constant pressure value applied to its inverting input. As a result, the controller 33 functions as a range modifier and amplifies the applied signal by a predetermined factor and applies the amplified signal to automatic/manual stations 34 and 36. The automatic/manual stations 34 and 36 in their automatic mode repeat the applied input signal individually to the forced draft blowers 1A1 and 1A2 individually to control the rate of operation of the two blowers.

The output signal of the steam pressure controller 21 is also applied to a low signal selector 35, which also receives the output signal from the fuel-air ratio relay 29. The low signal selector 35 takes the lower of the two applied signals and applies it through an automatic/manual station 39, called the "fuel oil master", to a characterizing relay 41 which modifies the applied signal in a preselected nonlinear manner and applies the modified signal to the fuel oil control valve 43 to control the position of the fuel oil control valve 43 and the fuel oil pressure to the burners of the boiler 1A.

The steam flow transmitter signal is also applied to the positive input, a pneumatic controller 45, called the "combining relay", which also receives the pneumatic output signal from the feedwater flow transmitter 14 applied to its inverting input. The controller 45 substracts the output signal of the feedwater flow transmitter representing the rate of feedwater flow from the output of the steam flow transmitter 13 representing the rate of steam flow and applies a signal representing the resulting difference to the positive input of a pneumatic controller 47, called the "feedwater flow controller", which also receives the pneumatic output signal from the drum level transmitter 15 applied to its negative input. The feedwater flow controller subtracts the signal applied from the drum level transmitter 15, representing the level of water in the drum, from the output signal of the combining relay 45 and changes its output signal in accordance with the resulting difference. This output signal is applied through an automatic/manual station 49, called the "feedwater master", to the feedwater control valve 51. The pneumatic signal on the output side of the feedwater master 49 is applied back to the feedwater controller 47 through an integrating reset circuit 50 to the summing input of the feedwater controller 47 in order to reset the output of the feedwater controller 47.

The above system automatically controls the forced draft blowers 1A1 and 1A2, the fuel oil control valve 43 and the feedwater control valve 51 to maintain the rate of air flow provided by the forced draft blowers, the fuel pressure at the burners, and the rate of feedwater flow to the boiler at the proper values in response to the drum pressure sensed by the steam pressure transmitter 11, the rate of air flow from blowers, sensed by the air flow transmitter 12, the rate of steam flow sensed by the steam flow transmitter 13, the rate feedwater flow sensed by the feedwater flow transmitter 14, and the water level in the drum sensed by the drum level transmitter 15.

Should the steam pressure in the drum decrease from 1250 PSI while the other sensed parameters remain constant, this will decrease the value of the pneumatic signal applied to the steam pressure controller 21, unless the corresponding signal from other boiler is at a higher value as determined by the high signal selector 13. This action will cause the pneumatic output signal from the steam pressure controller 21 to increase, which in turn in will cause the output from the air flow controller 27 to increase. As a result, the output from the steam flow rate relay 31 will increase and cause the output from the range modifier 33 to increase thus increasing the rate of revolution of the forced draft blowers. The output signal from the steam pressure controller 21 is also applied to the low signal selector 35. But this output signal will not increase unless the output signal from the steam pressure controller is less than the pneumatic output signal from the fuel-air ratio relay. If this condition does prevail, the low signal selector 35 will increase its output signal, with the output signal of the steam pressure controller 21. This action, in turn will cause an increased output signal to be applied by the characterizing relay 91 to the fuel oil control valve 43. As a result, the fuel oil control valve 43 will increase the fuel pressure to the burners to thus start to counteract the drop in drum pressure of the boiler. In a similar manner, an increase in the drum pressure will cause the fuel pressure and rate of operation of the forced draft blowers to decrease.

If on the other hand, the air flow from the forced draft blowers starts to increase with the other parameters remaining constant, then the fuel-air ratio relay 29 in response to the increased pneumatic output signal from the air flow transmitter 12 will apply an increased pneumatic signal to the air flow controller 27. This action will cause a reduced output signal from the air flow controller 27, which in turn will cause a reduced pneumatic signal to be applied from the steam flow rate relay 31 to the range modifier 33 and ultimately to the blowers to reduce the rate that the blowers are turning to bring the air flow back to the proper level.

If the operator opens the steam throttle, the rate of steam flow from the drum will increase, which in turn will cause a drop in drum pressure. The drop in drum pressure as explained above, will cause the fuel pressure to increase the rate of firing of the burners. An increase in the rate of steam flow will cause an increase in the pneumatic feed forward signal applied to the steam flow rate relay 31 which will cause an increase in the signal applied to the forced draft blowers increasing the rate of operation of these blowers and thus increasing the rate of air flow in response to an increase of steam flow as sensed by the steam flow transmitter to correspond with an anticipated increased firing rate of the burners.

An increased signal from the steam flow transmitter 13, representing increased steam flow, will also cause the combining relay 45 to produce an increased output signal to the feedwater flow controller 47, which in turn will apply an increased pneumatic signal to the feedwater control valve 51 to move this valve 51 to a more open position and increase the rate of feedwater flow to the boiler. As the rate of feedwater flow increases the output signal from the feedwater flow transmitter 14, will increase and thus offset the output signal from the steam flow transmitter 13 applied to the combining relay 45. On the other hand, if the feedwater flow transmitter 14 senses an increase rate of feedwater flow with the other parameters remaining constant, it will cause the output signal from the combining relay 45 to decrease and this in turn will cause the feedwater valve 51 to move to a more closed position.

The rate of feedwater flow to the drum will affect the water level in the drum. With the other parameters remaining constant, an increase in the drum level will cause the feedwater controller 47 to apply a decreased pneumatic signal to the feedwater control valve 51 to close the feedwater control valve and a drop in the drum level as sensed by the drum level transmitter will cause the feedwater controller 47 to apply an increased signal to the feedwater control valve 51 to move the feedwater valve 51 to a more open position.

In the system as shown in FIG. 1, a transducer 71 is provided to sense the steam pressure in the drum and convert this drum pressure to a digital signal, which is applied to the computerized monitoring system of the present invention. In addition, pneumatic transducers 72 through 92 are provided sensing different points in the pneumatic system as indicated in FIG. 1. The pneumatic transducers convert these pneumatic signals to digital values which are applied to the computer monitoring and verification system. The transducers 72 through 76 respond to the pneumatic output signals from the transmitters 11 through 15. The pneumatic transmitter 77 responds to the output signal from the high signal selector 13. The transducer 78 responds to the pneumatic signal in the reset circuit 23 applied to the summing input of the steam pressure controller 21. The transducer 79 responds to the output signal from the steam pressure controller 21 on the input side of the boiler master 25. The transducer 80 responds to the pneumatic pressure on the output side of the boiler master 25. The transducer 81 responds to the pneumatic pressure on the output side of the fuel-air ratio relay 29. The transducer 82 responds to the pneumatic pressure in the reset circuit 31 applied to the summing input of the air flow controller 27. The transducer 83 responds to the output pressure from the air flow controller 27 The transducer 84 responds to the pneumatic pressure in the integrating circuit 53 connected to the inverting input of the steam flow rate relay 31. The transducer 85 responds to the pressure on the output side of the steam flow rate relay 31. The transducer 86 responds to the output pressure from the range modifier 33. The transducer 87 responds to the output pressure from the low signal selector 35. The transducer 88 responds to the output pneumatic pressure from the characterizing relay 41. The transducer 89 responds to the output pneumatic pressure from the combining relay 45. The transducer 90 responds to the pneumatic pressure in the reset circuit 50 applied to the summing input of the feedwater controller 47. The transducer 91 responds to the output pneumatic pressure from the feedwater controller 47 on the input side of the feedwater master 49. The transducer 92 responds to the pneumatic pressure on the output side of the feedwater master 49.

A tachometer 93 senses the rate of rotation of the forced draft blower 1A1 and applies a digital signal representing this rate of rotation to the computer system. A tachometer 94 senses the rate of rotation in the forced draft blower 1A2 and applies a digital signal representing this rate of rotation to the computer system. A transducer 95 senses the fuel oil pressure on the input side of the fuel oil control valve and applies a digital signal representing this value to the computer system. A transducer 96 senses the fuel oil pressure on the output side of the fuel oil control valve 45 and applies a digital signal representing this value to the computer system. A transducer 97 senses the water pressure in the feedwater header leading to both the feedwater control valve 51 and the feedwater control valve for the other boiler not shown, and applies the digital signal representing this pressure to the computer system.

Figure 2:
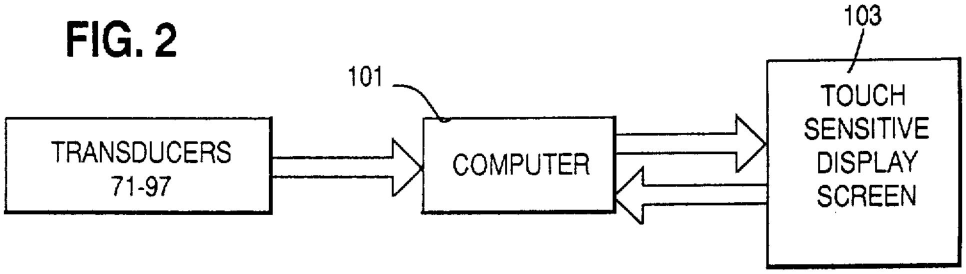
FIG. 2 is a schematic block diagram illustrating the system of the invention.
Figure 4:
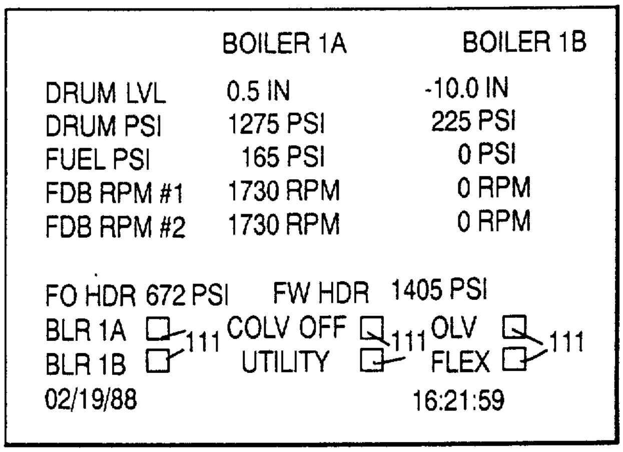
FIG. 4 illustrates the main page display produced on the touch sensitive display screen by the computer system.
Figure 3:
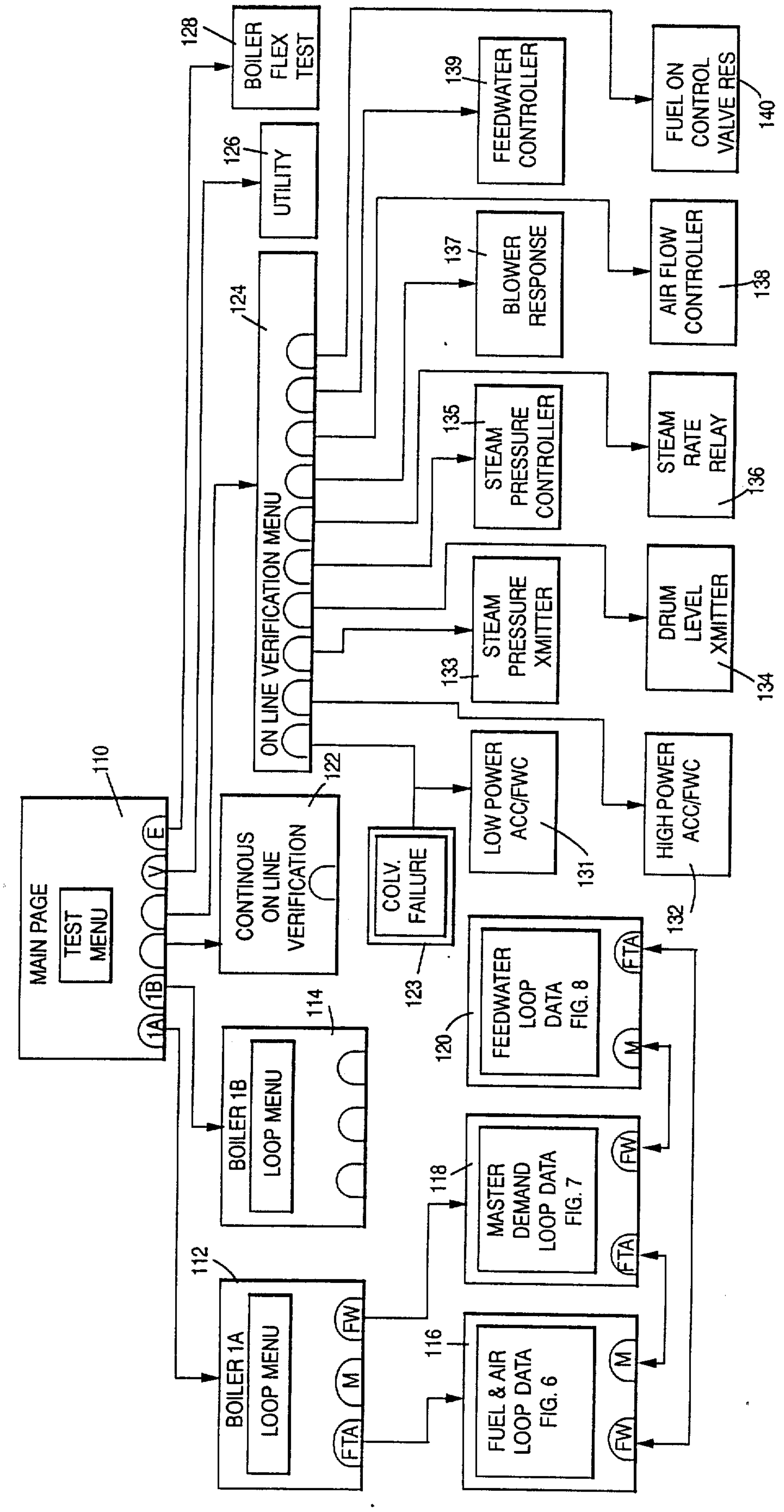
FIG. 3 is a flowchart illustrating the computer program employed in the computer of the system of the present invention to carry out the various tests on the pneumatic system.

As illustrated in FIG. 2, the computer system comprises a computer 101 which is operable to receive each of the applied digital signals from the transducers 72 through 97, 10 times per second. The digital computer 101 controls a touch sensitive display screen 103 to display messages to the operator as is explained below. FIG. 3 is a flowchart illustrating the program resident in the computer 101 to carry out the test procedures on the pneumatic control system as shown in FIG. 1 in accordance with present invention. As shown in FIG. 3, when the computer 101 is turned on, it will enter routine 110 and display on the screen of the touch sensitive display 103 the main page. An example of the main page displayed by this instruction sequence is illustrated in FIG. 4. As shown in FIG. 4, the display includes two columns under the legends "Boiler 1A" and "Boiler A1B" to indicate sensed parameters for each of the two boilers controlled by the pneumatic system of FIG. 1. The first line of data identified by the legend DRUM LVL represents the drum level in the two boilers as a difference in inches from normal level. This data is determined from the corresponding drum level transmitter. For the boiler 1A the output from drum level transmitter 15 will be transmitted to the computer 101 by the transducer 76. The next line of data identified by the legend DRUM PSI represents the drum pressure in the two boilers. The drum pressure is sensed directly by transducers. For the boiler 1A, the sensing transducer is the transducer 71 which transmits a digital signal representing the drum pressure in boiler 1A to the computer 101. The next line identified by the legend FUEL PSI represents the fuel pressure as applied to the boiler burners and is sensed by transducers on the output side of the fuel control valve. For the boiler 1A, this pressure is sensed by the transducer 96. The next two lines designated FDB RPM and FDB RPM represents the rates of revolution of the corresponding forced draft blowers. These rates of revolution are sensed directly by tachometers. For the boiler 1A, they are the tachometers 93 and 94 which apply digital signals representing the rates of revolution directly to the computer 101. The next line of data on the main page containing the legend OIL HDR and FW HDR are the oil header pressure as sensed by the transducer 95 and the feedwater header pressure as sensed by the transducer 97. Beneath this line are 6 touch sensitive targets 111, each adjacent to and designated by a separate one of the following legends BLR 1A, BLR 1B, COLV OFF, UTILITY, OLV, and FLEX. Touching the targets designated by these legends will cause the program to enter into different portions of the program. Touching the target designated "BLR 1A" will cause the program to enter into instruction sequence 112, in which selected parameters from the boiler 1A control system can be displayed. Touching the target designated BLR 1B will cause the program to enter instruction sequence 114 and display selected parameters in the pneumatic control system for the boiler 1B. Touching the target designated COLV OFF will turn the continuous on-line verification test on. When the continuous on-line verification is turned on, the program will advance into routine 122, in which the continuous on-line verification test is carried out. In this routine, the program will continue to display the main page as shown In FIG. 4 except that instead of the legend COLV OFF, the screen will display the legend COLV ON to indicate that the continuous line verification routine is being carried out. The legend OLV on the main page as shown in FIG. 4 designates the target for selecting the group of on line verification tests by the system. When this legend is touched, the program advances into the routine 124 in which the on-line verification menu is displayed. Touching the target designated by the legend UTILITY causes the program to branch into the utility routine, in which computer parameters, limit values, constant time intervals, etc made use of in the test performed by the system can be modified. Touching the target on the main page designated by the legend FLEX will cause the program to enter routine 128 to carry out the boiler flex test.

Figure 5:
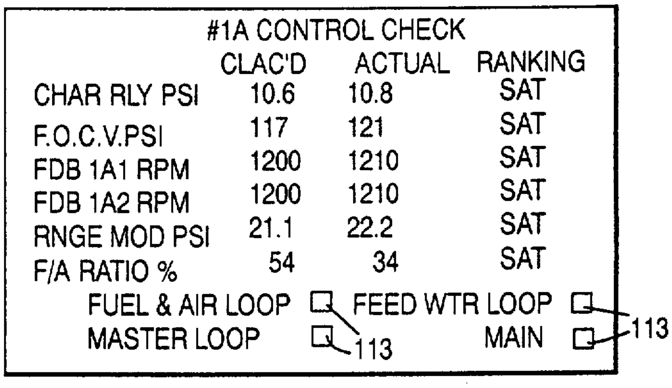
FIGS. 5 through 8 illustrate examples of various displays generated on the display screen by the system of the invention when the system is operating in a mode to display component values.

FIG. 5 illustrates an example of the display created on the screen by instruction sequence 112, which as explained above, is entered into in response to the operator touching the target designated BLR 1A on the main page display shown in FIG. 4. At the top of the display is a legend indicating that the data Is from the control system for boiler 1A. Parameter data in three columns is listed for the characterizing relay output pressure, the fuel oil control valve output pressure, the forced draft blower operating rates, the range modifier output pressure, and the ratio provided by the fuel-air ratio relay in percentage. The first column under the legend CALC'D indicates what the calculated value of each of the listed parameters should be. The second column under the legend ACTUAL indicates what the actual parameter is as measured. The third column under the legend RANKING indicates whether actual reading is satisfactory or unsatisfactory, that is whether measured value is within permitted deviation from the calculated value for corresponding parameter. The actual value for the characterizing relay output is measured by the transducer 88. The actual value for the fuel oil control valve output pressure is measured by the transducer 96. The actual value for the rate of rotation of the forced draft blowers are measured by the tachometers 93 and 94. The actual value for the range modifier output is measured by the transducer 86. The legend F/A RATIO % indicates the ration of output to input provided by the fuel-air ratio relay. The actual value for this ratio is measured by the ratio of the relay output pressure measured by transducer 81 divided by the relay input pressure as indicated by the by the transducer 73. The calculated value for the output pressure from the characterizing relay is determined from the input pneumatic pressure to the characterizing relay 41 as indicated by the transducer 87 and modified by the characteristic of the characterizing relay. The calculated value for the output pressure from the fuel oil control valve is determined from the pneumatic input signal applied to the control valve as represented by the output of the transducer 88. A given pneumatic signal applied to the fuel oil control valve should produce a corresponding position in the fuel oil control valve, which in turn should produce a corresponding fuel oil output pressure. The calculated values for the forced draft blowers are determined in a similar manner from the pneumatic signal applied to the forced draft blowers as indicated by the transducer 86. The calculated value for the range modifier output pneumatic pressure is determined from the pneumatic pressure applied to the input of the range modifier as indicated by the transducer 85 and the characteristic of the range modifier itself.

Figure 6:
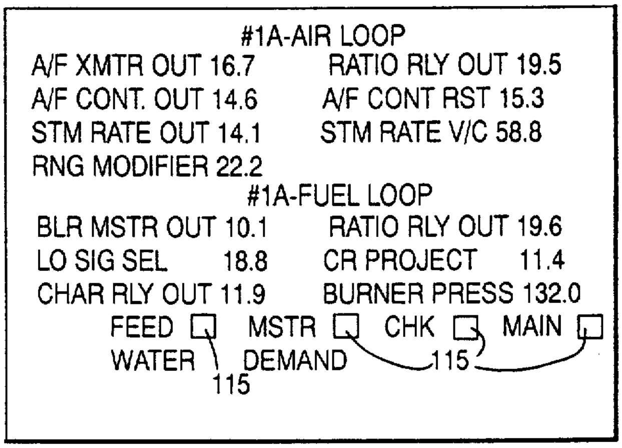

At the bottom of the screen, illustrated in FIG. 5, produced by instruction sequence 112, there are touch sensitive targets 113 each identified by a different legend adjacent thereto. Touching the target designated MAIN will cause the program to return to instruction sequence 110 to display the main page. Touching the target adjacent to the legend FUEL & AIR LOOP will cause the program to enter instruction sequence 116 as shown in FIG. 3 and display data read from the pneumatic control system relating to the control of the fuel oil and the air supply. FIG. 6 illustrates an example of the display provided in instruction sequence 116. The screen in FIG. 6 displays under the legend AIR LOOP, the pneumatic pressure at the output of the air flow transmitter 12 as sensed by the transducer 73, the pneumatic pressure at the output of the air flow controller 27 as sensed by the transducer 83, the pneumatic pressure at the output of the steam flow rate relay 31 as sensed by the transducer 85, the pneumatic pressure at the output of the range modifier 33 as sensed by the transducer 86, the pneumatic pressure at the output of the fuel-air ratio relay 29 as sensed by the transducer 81, the pressure in the air flow controller reset circuit 30 as sensed by the transducer 82, and the integral of the rate of steam flow represented by the pneumatic pressure in the integrating circuit 53 applied to the inverting input of the steam flow rate relay 31, as sensed by the transducer 84. These pressures are displayed adjacent to correspondIng identifying legends. The legend identifying the integral of the steam flow rate is STM RATE V/C, the last part of this legend standing for volume chamber, which is a component of the integrating circuit, which provides the pressure representing this valve.

Under the legend FUEL LOOP, the pneumatic pressures at the outputs of the boiler master 25, the low signal selector 35, the characterizing relay 41, and the ratio relay 29 as sensed by the transducers 80, 87, 88 and 81 respectively are displayed adjacent corresponding legends. In instruction sequence 116, the program also computes what the output of the characterizing relay 41 is projected to be based on the pneumatic pressure applied to the input of the characterizing relay 41 as indicated by the transducer 17 and the characteristic of the characterizing relay. This calculated pressure is displayed adjacent to legend CR PROJECT. In addition, the fuel oil pressure at the burners for the boiler 1A as sensed by the transducer 96, is displayed opposite the legend BURNER PRESS.

At the bottom of the screen displayed by instruction sequence 116 and shown in FIG. 6 are four touch sensitive targets 115 identified by adjacent legends FEEDWATER, MSTR DEMAND, CHK and MAIN. Touching the target next to "CHK" will cause the program to go back to instruction sequence 112 and display the screen in FIG. 5. Touching the target adjacent MAIN will cause the program to return to instruction sequence 110 and display the main page as shown in FIG. 4. The other two targets shown in FIG. 6 correspond to targets shown in FIG. 5 and will be discussed below.

Figure 7:
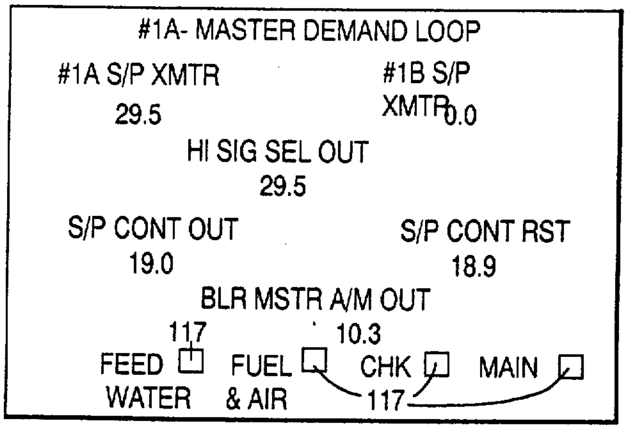
Figure 8:
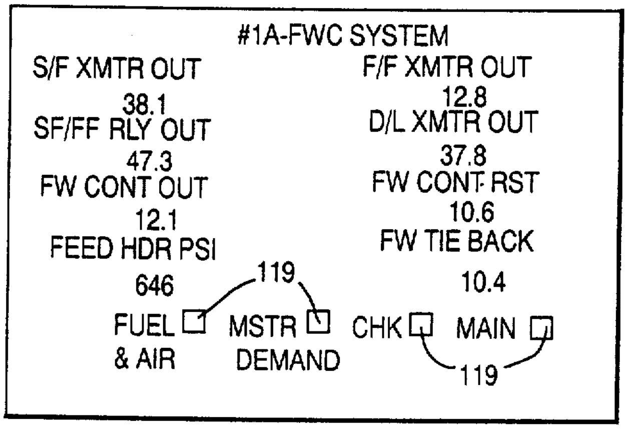

While in instruction sequence 112 and displaying the display of FIG. 5 if the operator touches the target 113 adjacent the legend MASTER LOOP, the program will advance to instruction sequence 118 and display data from the pneumatic control system in the master demand loop, as shown in FIG. 7. If while in instruction sequence 112, in which FIG. 5 is displayed, the operator touches the target 113 adjacent the legend FEED WTR LOOP, the program will advance into instruction sequence 120 and display feedwater loop data as shown in FIG. 8. If while the display of FIG. 6 is being displayed by instruction sequence 116, the operator touches the target 15 adjacent the legend FEEDWATER, the program will go from instruction sequence 116 to instruction sequence 120 and display the feedwater loop data, as shown in FIG. 8. If the operator, while the program is in instruction sequence 116 displaying FIG. 6, touches the target 115 designated by the legend MSTR DEMAND, the program will advance into instruction sequence 118 to display the master demand loop data as shown in FIG. 7.

As shown in FIG. 7, the data in this display includes the output pneumatic pressure of the steam pressure transmitter 11 for the boiler 1A detected by transducer 72 and also the output pressure for the corresponding steam pressure transmitter for the boiler 1B under appropriate legends. In addition, the pneumatic output pressure of the high signal selector 17, the output pressure of the steam pressure controller 21, and the pressure in the reset circuit 23 of the steam pressure controller are displayed along with the output pressure of the boiler master 25 under corresponding legends. These displayed values are detected by the transducers 77, 79, 78 and 80 respectively.

By means of the touch sensitive targets, 117 at the bottom of the screen in FIG. 7, the operator can transfer the program to instruction sequences 116, 120, 112, or 110 similarly to the response of the program in instruction sequence 116 to the touch sensitive targets 115 on the screen of FIG. 6.

When the program is in instruction 120, it will display data from the pneumatic control loop controlling the feedwater to the boiler. FIG. 8 represents an example of a screen displayed by the instruction sequence 120. The data displayed on the screen by this instruction sequence includes display of the pneumatic output pressures of the steam flow transmitter 13, the feedwater flow transmitter 14, the combining relay 45, the drum level transmitter 15, the feedwater controller 47 and the feedwater controller reset circuit 50 sensed by the transducers 74, 75, 89, 76, 91 and 90 respectively. In addition, the feedwater header pressure sensed by the transducer 97 and the pneumatic output pressure from the feedwater master 49 sensed by the transducer 92 are also displayed along with the appropriate legends.

At the bottom of FIG. 8 are four touch sensitive targets identified by appropriate legends by which the program can be switched into instruction sequence 116, 118, 112 or 110 to display the corresponding screens.

Figure 9:
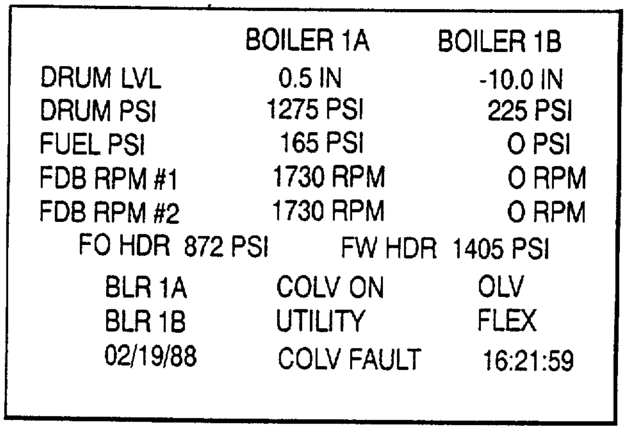

As explained above, the continuous on line verification of the system can be turned on and off by touching the touch sensitive target 111 adjacent the COLV legend on the main page. When the continuous on-line verification test is being run, the program in routine 122 will measure the outputs from all the transducers and determine whether or not they are within margins of acceptability, that is, close enough to what they should be to be considered operating satisfactory. Routine 122, while conducting the continuous on-line verification test will display the main page as shown In FIG. 4 except that the legend COLV ON will replace legend COLV OFF as shown in FIG. 9. When the COLV test is being run by routine 122, the system continuously determines whether the output values read by all of the transducers are close enough to the values calculated by the system as to what these values should be to be satisfactory readings. If they are not, the display will show the legend COLV FAULT as shown in FIG. 9. Touching the touch sensitive screen target adjacent the legend COLV FAULT will cause the screen to advance into instruction sequence 123 and display legends indicating where the faults occur. An example of the faults displayed by instruction sequence 123 is shown in FIG. 10. As shown in this Figure the faults are listed under the legends 1A FAULTS and 1B FAULTS, indicating which components in the control systems for the two boilers were determined to be faulty. In the example illustrated in FIG. 10, the output of the reading from the high signal selector, the air flow controller 27 and low signal selector 35 as read by the corresponding transducers have been determined to be outside the computed satisfactory ranges for these values.

To carry out the continuous on-line verification test, the computer reads the drum pressure as indicated by the transducer 71 and computes what the pneumatic output pressure from the steam pressure transmitter 11 should be. It then compares this output pressure with the pressure sensed by the transducer 72 and determines whether the pressure indicated by the transducer 72 is within a predetermined tolerance range of the calculated value to determine whether the steam pressure transmitter 11 is operating satisfactorily. If not, a fault will be indicated by the FAULT legend on the main page as shown in FIG. 9, and upon touching the target 121 to cause the list of faults to be displayed, the legend STM PRESS XMITTER would be displayed under the legend 1A FAULTS to indicate that the steam pressure transmitter of the boiler 1A is operating unsatisfactorily. Similarly the pneumatic pressures that should be produced at the points in the pneumatic systems sensed by the sensors 77 through 92 are computed and compared with the sensed values and determine whether or not they are in the satisfactory range or not.

To carry out this calculation for the steam pressure controller 21, for example, the system employs the pneumatic signal received from the transducer 77 and using this value plus the characteristic of the controller 21 taking into account the effect of the reset circuit 23, determines what the pneumatic pressure should be at the output and compares this value with the pressure read by the transducer 79. To take into account the effect of the reset circuit 23, the computer continuously integrates computed output pressure in accordance with the characteristic of the reset circuit and adds the integral to the product of the difference between 30 PSI and the input pressure sensed by the transducer 77 times t he gain characteristic of the steam pressure controller. In a similar manner each of the other pressures or parameters are automatically and continuously calculated from the sensed data and compared with the outputs from the corresponding transducers and in this manner the system provides a continuous verification of the satisfactory operation of the pneumatic control system.

When the on-line verification option has been selected from the main page and the program has advanced into instruction sequence 124, the program will display on the display screen a menu of 10 different on-line verification tests each identified by an appropriate legend and each having a touch sensitive target adjacent thereto. By touching the appropriate target the operator can cause the program to enter into any one of the on-line verification test routines 131 through 140.

Figure 11:
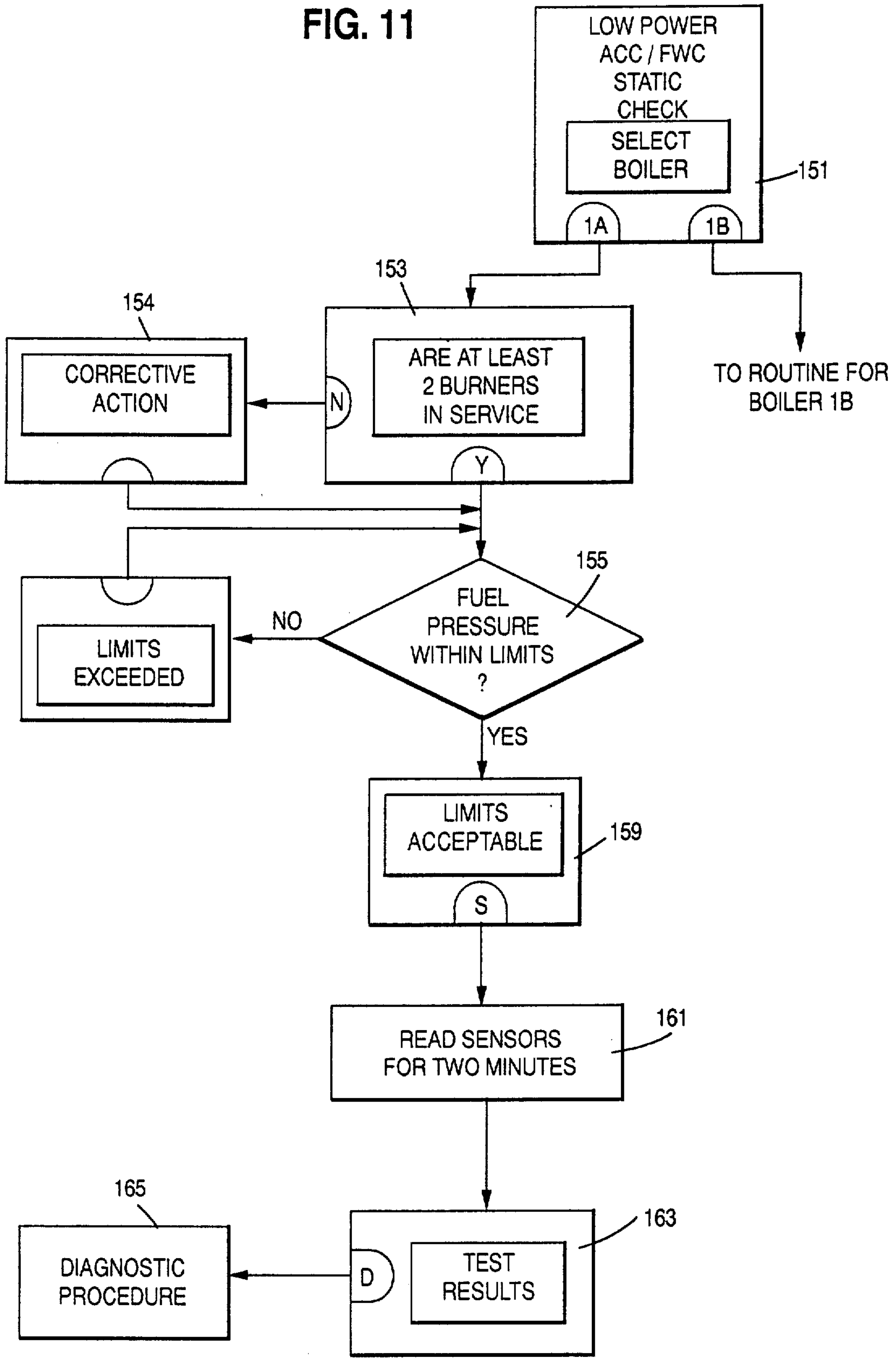
FIG. 11 is a flowchart of a routine for performing an on-line verification test comprising a low power static check of the pneumatic control system.

The details of the routine 131, which is the low pressure static check of the entire pneumatic control system for a given boiler operating automatically, is represented by the flowchart shown in FIG. 11. The program begins this routine with instruction sequence 151 in which it displays an instruction to the operator to select one of the two boilers 1A or 1B by touching one of two touch sensitive targets appropriately designated by legends on the screen. A third target designated by the legend MAIN, if touched by the operator, will return the program to the instruction 110 to display the main page. Upon touching the target designated 1A, the program will start into a series of instructions, the first of which is the instruction sequence 153. Touching the target designated 1B will cause a program to branch to an identical sequence of instructions but related to the boiler 1B instead of the boiler 1A and which for purposes of simplification, have not been illustrated in FIG. 11.

In instruction sequence 153, the plant line up for the low power static check for the boiler 1A is displayed, which is that the boiler 1A is being fired and that both forced draft blowers 1A1 and 1A2 are on. In addition, the current fuel oil pressure is displayed. At this time, the screen displays the question to the operator ARE AT LEAST TWO BURNERS IN SERVICE ON 1A BOILER, and is presented with two touch sensitive targets one designated by the legend YES and the other one designated by the legend NO. If the operator touches the target designated NO, the program branches to instruction sequence 155, in which the program displays a message to the operator indicating that two burners must be operating to carry out this test. When the operator has brought at least two burners into operation, he can proceed with this test by touching an appropriately labeled target, whereupon the program will advance into decision sequence 155. If the operator touches the touch sensitive target designated YES in instruction sequence 153, the program proceeds into decision sequence 155, in which the program determines from the outputs of the transducer 96, whether the fuel pressure to the burners of the boiler 1A are between 50 and 90 PSIG. For the low power static test to be performed, the fuel pressure must be in this range. If the fuel pressure is not in this range, the program branches to instruction sequence 157 and displays the message that a test limit has been exceeded. In addition, the current fuel oil pressure will be displayed as well as a message indicating that the limits for the fuel oil pressure are between 50 and 90 PSIG In addition to these messages, the screen will display a message to the operator to proceed when the limit is cleared. Also, a touch sensitive target designated by the legend PROCEED is be provided on the screen. If the operator touches this target, the program will return to decision sequence 155 and again determine whether or not the fuel pressure is within the designated limits The operator should be able to adjust the fuel pressure to within the specified limits by adjusting the position of the steam throttle. Opening the steam throttle to draw more steam should cause the pneumatic control system of FIG. 1 to increase the fuel pressure and closing the steam throttle to draw less steam should have the opposite effect. If in instruction sequence 155, the program determines that the pressure is within 50 to 90 PSIG, the program proceeds to instruction sequence 159 and displays a message to the operator that the conditions are acceptable for the low power static check of boiler 1A. A touch sensitive target is provided designated by the legend START. Upon the operator touching this touch sensitive target, the program proceeds into instruction sequence 161, in which the program reads the outputs from all of the transducers 71 through 97 for the period of 2 minutes, each transducer being read and the data received therefrom by the computer 10 times per second. After two minutes of acquiring the data from all of the transducers, the program proceeds into instruction sequence 163 in which the test results are displayed The test results are displayed in multiple pages, or in other words on different screens which are called up by the operator in sequence. An example of one of the pages of the test results is illustrated in FIG. 12, which displays the test results for the drum pressure read by the transducer 71, the pneumatic output pressure from the steam pressure transmitter 11 read by the transducer 72 and the ratio being provided by the fuel-air ratio relay 29 determined by taking the ratio of the pneumatic output pressure from the ratio relay 29 read by the transducer 81 to the input pressure to the relay 29 read by the transducer 73. Under each component for which data is being given in FIG. 12, a high limit and a low limit for each of the values being displayed is displayed. For the drum pressure and the steam pressure transmitter output, the maximum value and the minimum value during the two minute interval of instruction sequence 161 are displayed. The determined ratio for the ratio relay is given opposite the MAX legend. Since the ratio would not change during the two minute interval, a minimum value is not displayed. The bottom lines of the columns indicate whether the read or determined values were satisfactory or unsatIsfactory. At the bottom of the page, two touch sensitive targets are displayed, one opposite the legend EXIT and the other one opposite the legend MORE. Touching the target opposite MORE will cause the program to go to the next page where other elements in the system are displayed in the same manner as displayed in FIG. 12. Touching the target opposite EXIT will return the system to the on-line verification test menu. In addition, the legend DIAG is displayed for diagnostic. Touching this target will cause the program to branch to instruction routine 164. The operator is supposed to touch this target if one of the results displayed is indicated as unsatisfactory as opposed to satisfactory. In instruction sequence 164, the operator is led through a diagnostic procedure to determine the reason for the unsatisfactory test result.

The routine 132 is to carry out a high power static check and is similar to the routine 131 for the low power static check except that the test of this program must be carried out with the oil pressure between 250 and 300 PSI. Accordingly, in routine 132, after the operator has been directed to select the boiler and has confirmed that at least two burners are in service, as in instruction sequences 151 and 153 in the low power static check as shown in FIG. 11, the program determines whether the oil pressure is within these limits and branches accordingly as described above with respect to FIG. 11.

Figure 13:
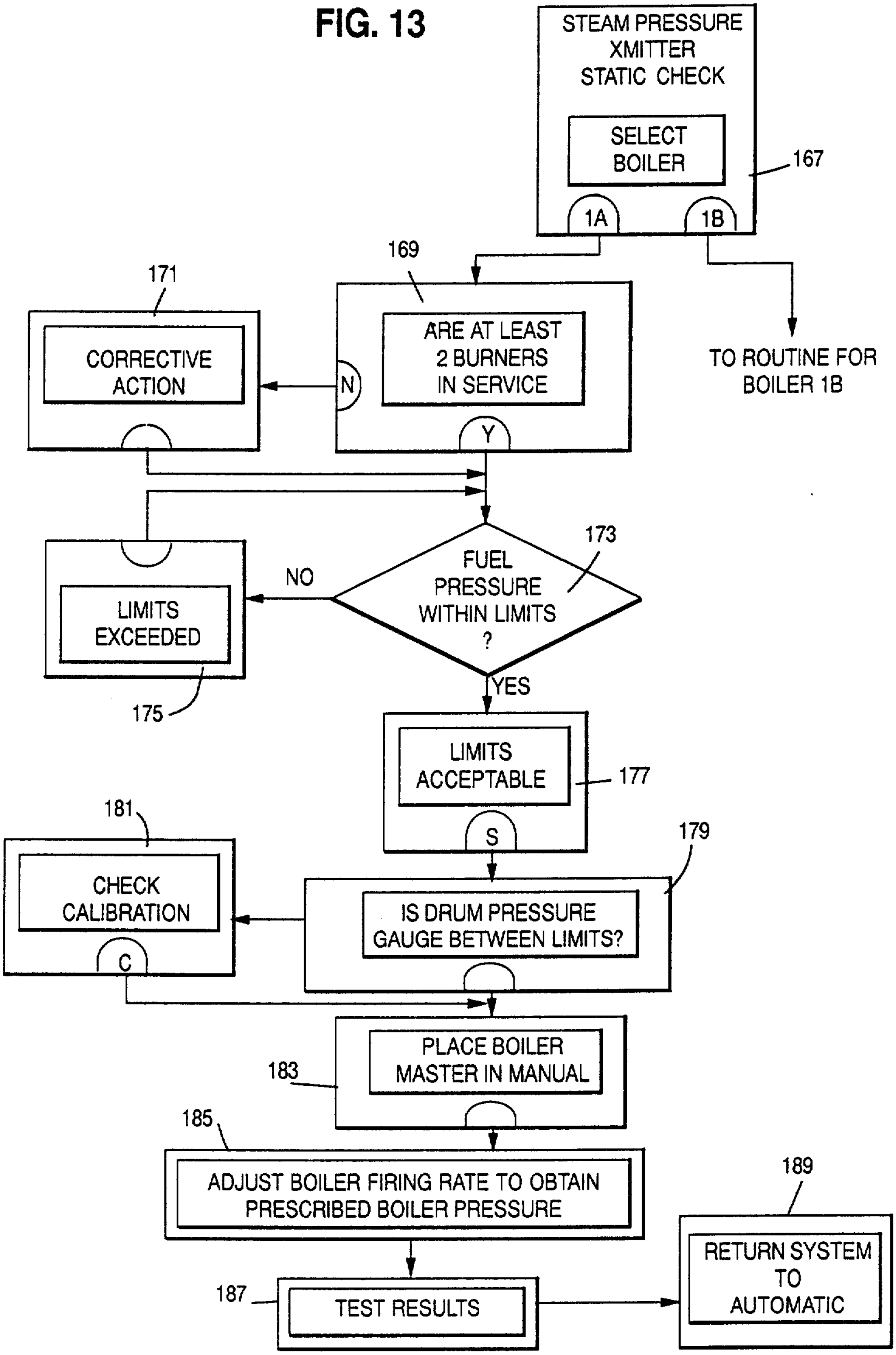
FIGS. 13 through 20 are flowcharts illustrating different online verification test performed on various components of the pneumatic control system by the system of the present invention.

The routine 133 is to carry out the on-line verification test on the steam pressure transmitter. The details of the steps of this routine are illustrated by the flow chart of FIG. 13. As shown in this figure, in routine 133, the program first enters instruction sequence 167 in which a message is displayed to the operator to select one of the boilers 1A or 1B, which the operator does by touching an appropriate target. If the operator touches the target for the boiler 1A, the program starts the sequence for boiler 1A by branching to instruction sequence 169 and displays a question to the operator asking him if at least two burners are in service. Touching the target designated 1B will cause the program to commence an identical sequence for the boiler 1B. If in instruction sequence 169, the operator touches the target designated by the legend NO, the program branches to the routine 171 in which a message Is dIsplayed to the operator indicating that at least two burners must be in service to perform this on-line verification test. After the operator has placed at least two burners in service, he can continue the test by touching an appropriately labeled target to cause the program to advance into decision sequence 173. If the operator touches the target designated YES, instruction sequence 169, the program proceeds directly into decision sequence 173, in which the program determines whether the fuel pressure, as indicated by the transducer 96, is between 75 and 150 PSI. If the fuel pressure is not between these limits, the program branches to instruction sequence 175 in which a message to the operator is displayed that a limit has been exceeded and that the fuel pressure must be within 75 and 150 PSI. At this point, the operator should bring the fuel pressure within the limits by means of the steam throttle, and then touch the target on the screen desIgnated by the legend CONTINUE. Upon touching this target the program returns to decision sequence 173 whereupon the program again determines whether the fuel pressure is within the prescribed limits. If the fuel pressure is within the prescribed limits in decision sequence 173, the program proceeds into instruction sequence 177 in which the message LIMITS ACCEPTABLE is displayed to the operator. The operator should then touch a touch sensitive target on the screen designated by the legend START. Upon the operator performing this action the program proceeds into instruction sequence 179 in which a question message is displayed to the operator instructing him to read the drum pressure gauge and asking him, if the gauge reads between two calculated limits, 10 PSI apart. The program routine calculates the pressure limits for the gauge reading by converting the pneumatic output pressure of the steam pressure transmitter to the value of the steam pressure that it represents and adding and subtracting 5 PSI from this steam pressure value. At this time, legends YES and NO will be displayed designating two touch sensitive targets. If the operator touches a target designated NO, indicating that the gauge reading is not between the prescribed limits, the program branches into instruction sequence 181, in which the operator is directed to check the gauge calibration and/or the transducer calibration. If by checking and correcting the calibration of one or both of these components, the steam pressure as indicated by the gauge is brought within the prescribed limits, the operator should then press the target on a screen designated by the legend CONTINUE, whereupon the program will enter into instruction sequence 183. If the calibration cannot be corrected, this will mean that the steam pressure gauge or the steam pressure transmitter has to be repaired and the test cannot continue. The operator should then touch a target on the screen designated by the legend QUIT which will terminate the on line verification test and return the program to instruction sequence 124 to display the on-line verification test menu.

If the operator touches the target designated by the legend YES in instruction sequence 179, which action he should carry out if he determines that the drum pressure as indicated by the gauge is between the prescribed limits, the program will advance into instruction sequence 183, in which an instruction message is displayed to the operator telling the operator to place the boiler master in manual. In response to this instruction, the operator should switch the boiler master 25 to its manually controlled state. After the operator has followed this instruction, the operator should then touch the target designated by the legend CONTINUE displayed on the screen by instruction sequence 183. In response to the touching of this target, the program advances into instruction sequence 185, in which the operator is instructed to carry out a series of instructions to adjust the boiler firing rate by the boiler master to obtain a series of steady steam drum pressures. He is first instructed to adjust the boiler firing rate by the boiler master to get a steady steam pressure of 1275 PSI. To carry out this instruction, the operator manually adjusts the control setting on the boiler master 25 to adjust the boiler firing rate to obtain the prescribed drum pressure. When this has been done, the operator then is instructed to adjust the boiler firing rate to obtain a steady steam drum pressure of 1250 PSI followed by instructions to adjust the boiler firing rate to get a series of different steady drum pressures between 1250 and 1300 PSI. Each time the stream pressure reaches and remains steady at a prescribed value as indicated by the transducer 71, the pneumatic pressure indicated by the transducer 72 is stored in the computer memory. When the last instruction in this sequence has been carried out, the program advances into instruction sequence 187 in which the test results are displayed to determine whether the steam pressure transmitter passed or failed the static check, the computer determines whether the output pressure of the steam pressure transmitter 11 is within the prescribed limits for each prescribed steady value of steam pressure reached during instruction sequence 185. If it was not, a failure message will be displayed to the operator. When a failure message is displayed, the operator will know that the steam pressure transmitter needs to be repaired or recallibrated.

In addition to displaying a pass or fail message to the operator in instruction sequence 187, the program will also display the maximum and minimum drum pressures to which the steam pressure transmitter was adjusted during instruction sequence 185 and also the maximum and minimum output pneumatic pressures from the steam pressure transmitter during instruction sequence 185. In addition, the difference between the maximum and minimum pressures for both the drum pressure and the steam pressure transmitter output will be displayed to the operator. The display of instruction sequence 187 will also include a legend CONTINUE designating a target, which when touched by the operator will advance the program into subroutine 189 to display a message to the operator to return the system to automatic, whereupon the operator should switch the boiler master 25 back to automatic operation. From instruction sequence 189, the program returns to instruction sequence 124 to display the on-line verification test menu.

Figure 14:
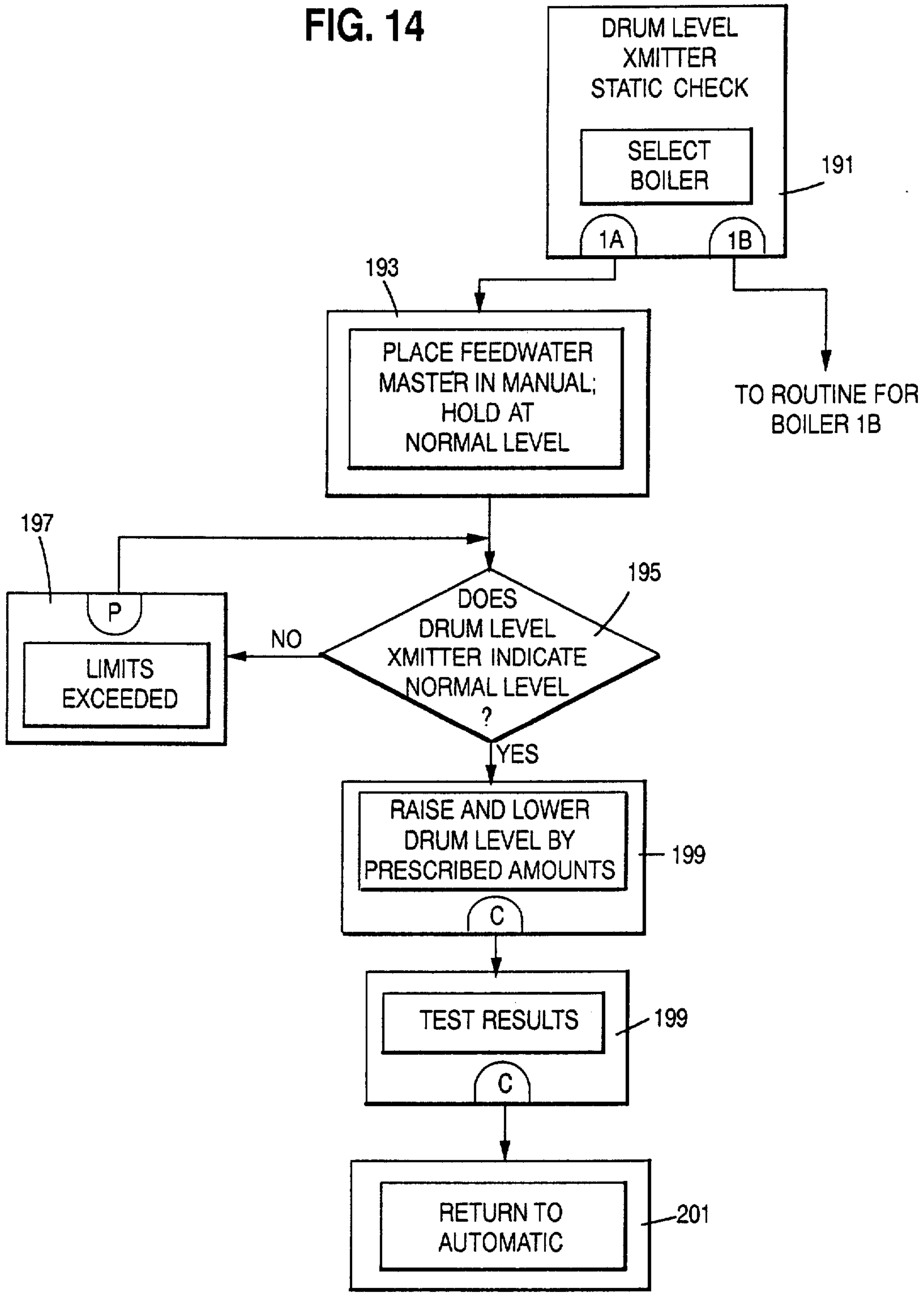

The routine 134 carries out the on-line verification test for a static check of the drum level transmitter. This routine is illustrated in more detail by the flow chart in FIG. 14. As in the previously described on-line verification tests, in the first instruction sequence 191 of this routine, the operator is instructed to select one of the two boilers for the test, boiler 1A or boiler 1B. The operator makes this selection by touching the appropriately designated touch sensitive target. If the operator touches the target designated 1A, the program proceeds into a sequence of steps described below to carry out a test of the boiler 1A. If the operator touches the target designated boiler 1B, the program advances into an identical set of instructions for the boiler 1B. When the target for the boiler 1A has been touched, the program advances into instruction sequence 193, in which the program will display an instruction to the operator to place the feedwater master in manual and hold the water level in the drum at the normal level. The operator performs this instruction by putting the feedwater master 49 in manual and adjusting the manual control of the master 49 to adjust the water level in the drum to the normal level as indicated by the drum level gauge glass. The computer then determines whether the drum level transmitter output pneumatic pressure reads at the normal level, e.g., 30 PSI within a predetermined tolerance. If it does not, the computer branches into instruction sequence message 197 and displays a message to the operator that the test limits for the drum level have been exceeded. The display screen will also indicate to the operator that the limits for the drum level are plus or minus one inch, meaning one inch above or below normal and to proceed when the limits have been cleared. The operator should try to adjust the drum level by means of the feedwater master to within the prescribed limits and then touch the target designated by the legend PROCEED, whereupon the program will return to decision sequence 195. If the pneumatic output pressure of the drum level transmitter 15 reads within the prescribed limits in decision sequence 195, the program advances into instruction sequence 199, in which the operator is first instructed to lower the drum level as indicated in the gauge glass to minus three inches from normal and to allow the level to stabilize followed by an instruction to raise the drum level pressure as indicated in the gauge glass to plus three inches. Following each instruction, the operator touches a target on the screen designated by the legend CONTINUE at which point the output pressure from the drum level transmitter is read and stored by the computer. When the operator has performed the last instruction of instruction sequence 197 and touched the target designated by the legend CONTINUE, the program proceeds into instruction sequence 199 and displays the test results, which will include a pass or fail message for the drum level transmitter. The computer determines whether the drum level transmitter has passed or failed by determining whether the drum level transmitter output pressure when the operator has adjusted the drum level to minus and plus three inches is at 21 PSI and 39 PSI within a predetermined tolerance range. In instruction sequence 199 the program also displays the values of the output pressure from the drum level transmitter at plus and minus 3 inches as adjusted by the operator in instruction sequence 197. If a fail message is displayed to the operator in instruction 199, the operator knows that the drum level transmitter needs to be repaired or recalibrated.

To proceed from instruction sequence 199, the operator touches a target designated by a legend CONTINUE whereupon the program proceeds into instruction sequence 201, in which the message to return the system to automatic is displayed to the operator. In response to this instruction, the operator should place the feedwater master back in its automatic state. After instruction sequence 201, the program returns to instruction sequence 124 to display the on-line verification test menu.

Figure 15:
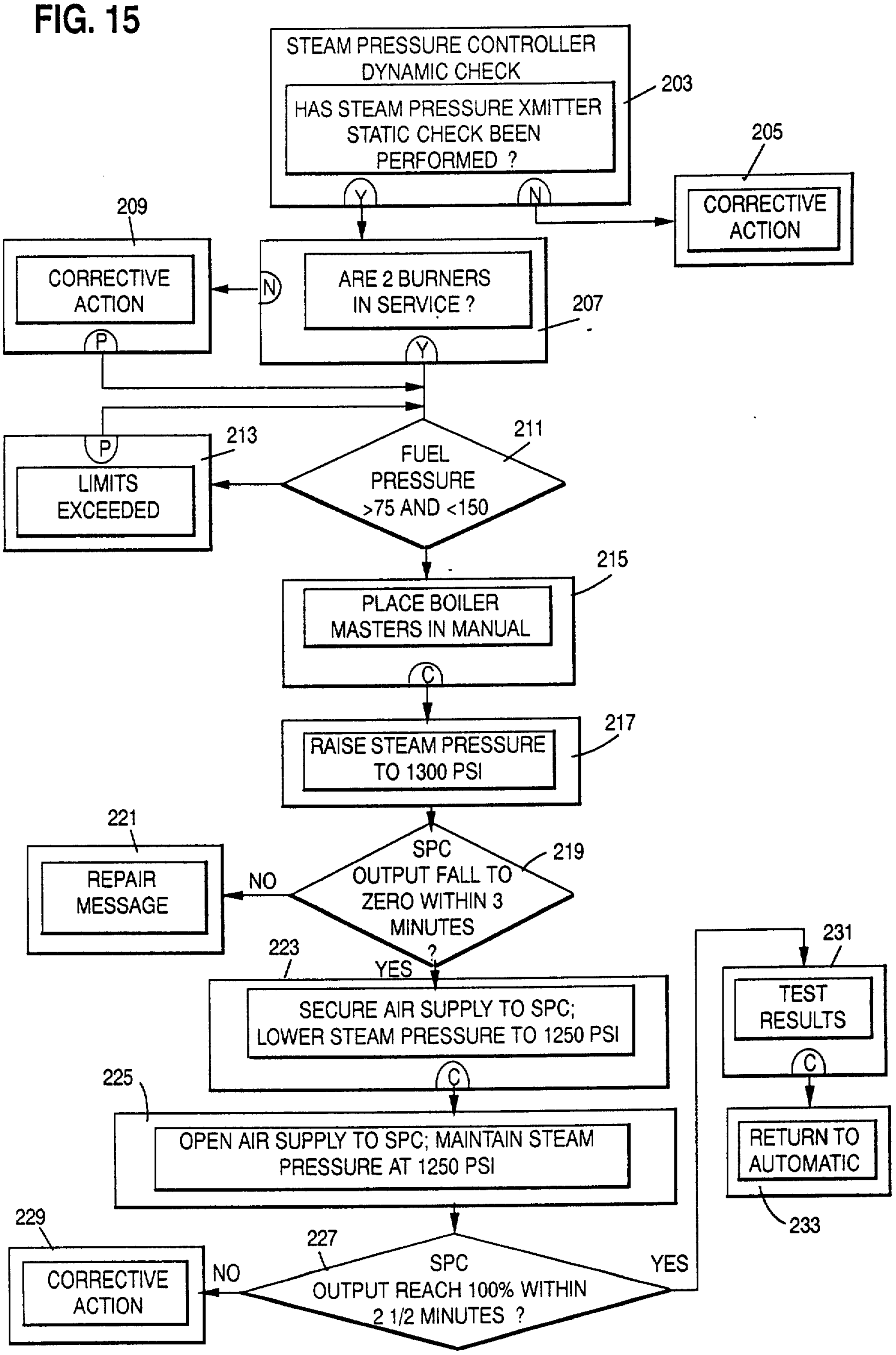

FIG. 15 is a flow chart of the routine for the on-line verification test to perform a dynamic check on the steam pressure controller. This routine is designated by the reference number 135 in FIG. 3. Upon entering this routine, the program first performs instruction sequence 203 in which the program displays a question to the operator asking the operator if the steam pressure static check has been performed and displays legends YES and NO designating two targets.

If the operator touches the target designated NO, the program branches into instruction sequence 205 to display a corrective action message to the operator, which is that the steam pressure transmitter check must be performed before the steam pressure controller dynamic check is performed. From instruction sequence 205, the program returns to instruction sequence 124 to display the on-line verification test menu. If the operator in instruction sequence 203 touches the target designated YES, the program proceeds into instruction sequence 207 in which a question is displayed to the operator asking if at least two burners are in service. If the operator touches the target designated by the legend NO in instruction sequence 207, the program branches into instruction sequence 209 in which a corrective action message is displayed to the operator indicating that two burners must be in service to perform the steam pressure controller dynamic check. From instruction sequence 209 the program can be advanced to instruction sequence 211 by touching a target designated by the legend PROCEED. If in instruction 207, the operator touches the target designated YES, the program also proceeds into decision sequence 211, in which the program determines whether the fuel pressure is between 75 and 150 PSIG as indicated by the transducer 96. If the fuel pressure is not within these limits, the program branches into instruction sequence 213 in which a message is displayed to the operator that the fuel pressure limits have been exceeded, that the fuel pressure limits for this test between 75 PSI and 150 PSI and to proceed when the limits have been cleared. In response to this message, the operator should adjust the throttle to bring the fuel pressure within the prescribed limits. Then upon touching a target designated by the legend PROCEED in instruction sequence 213, the program returns to decision sequence 211 to again determine whether the fuel pressure is within the prescribed limits. If in decision sequence 211, the program determines that the fuel pressure is within the prescribed limits, the program proceeds into instruction sequence 215 in which a message is displayed to the operator instructing the operator to place the boiler masters for both boilers in manual and to disable the steam pressure transmitter for the boiler not being tested. When the operator has carried out these instructions and touched the target designated by the legend CONTINUE in instruction sequence 215, the program proceeds into instruction sequence 217, in which a message is displayed to the operator to raise the steam pressure to 1300 PSI. In response to this instruction, the operator controls the boiler master 25 to increase the firing rate to raise the steam pressure. When the steam pressure reaches 1300 PSI as indicated by the transducer 71, the program will automatically proceed into decision sequence 219. In this decision sequence, the program monitors the output of the steam pressure controller 21 as indicated by the transducer 79 for up to 3 minutes. The output pneumatic pressure from the steam pressure controller 21 should fall to 0 before 3 minutes elapses because of the action of the reset circuit 23. If it does not, the program aborts the test by branching from decision sequence 219 into instruction sequence 221 to display a corrective action message to the operator indicating that the steam pressure controller output did not drop to 0 as it should and needs to be repaired. The program is advanced from instruction sequence 221 by the operator touching a target designated CONTINUE, whereupon a message is displayed reminding the operator to return the system to automatic. The program then returns to the on-line verification menu displayed by an instruction sequence 124 In response to the reminder to return the system to automatic, the operator should place both of the boiler masters back in their automatic modes and reactivate the steam pressure transmitter for the boiler not being tested. If the output from the steam pressure controller falls to zero within 3 minutes in decision sequence 219, the program proceeds into instruction sequence 223, in which a message is displayed to the operator, instructing the operator to secure the air supply to the steam pressure controller and lower the steam pressure to 1250 PSIG. In response to these instructions, the operator turns off the air supply to the steam pressure controller 21 and by means of the boiler master, lowers the steam pressure in the drum, as indicated to the operator by the output from the transducer 71 and displayed on the display screen to the prescribed pressure. After carrying out these instructions, the operator should touch the target designated by the legend CONTINUE in instruction 223, causing the routine to advance into instruction sequence 225.

In instruction sequence 225, a message is displayed to the operator directing the operator to open the air supply to the steam pressure controller and to maintain the steam pressure in the drum at 1250 PSI. When the air pressure is applied to the steam pressure controller, the pneumatic output pressure from the steam pressure controller initially will rise. This rise in pressure will be sensed by the transducer 79 and in response to this rise in pressure, the program will advance from instruction sequence 225 to decision sequence 227 in which the output pressure from the steam pressure controller is monitored for at least two and one half minutes to determine whether during this time period the output pressure from the steam pressure controller 21 reaches 100% or 60 PSI. If the output pressure from the pneumatic controller does not reach to within a preselected tolerance of this value within two and one half minutes, the program will terminate the test by branching to instruction sequence 229 in which a repair message is displayed to the operator. This message will indicate that the steam pressure controller did not reach its maximum value and that the repair or recalibration of the controller is required. From the instruction sequence 221, the program can be returned to instruction sequence 124 to display the on-line verification menu by the operator touching a target designated by the legend CONTINUE. When this target is touched, the operator will be reminded by a message to return the system to automatic and then the program will return to instruction sequence 124. In response to the reminder, the operator should reactivate the steam pressure transmitter of the boiler not being tested and place the boiler masters back in their automatic modes. If the steam pressure controller did reach 60 PSI within two and one half minutes, the program proceeds from decision sequence 227 into instruction routine 229 in which the test results are displayed indicating whether the steam pressure controller passed or failed the different phases of the test along with the test data recorded during the test. These test results include the amount of the step increase in the output pressure from the steam pressure controller when the air supply valve to the steam pressure controller was opened determined from readings taken in destruction sequence 225 and decision sequence 227, the gain characteristic of the steam pressure controller determined by the input and output values to and from the controller measured in decision sequence 227 immediately after the air supply valve to the steam pressure controller was opened, and the reset time, which is the time it took for the output pressure to reach 60 PSI after the air supply to the steam pressure controller was opened measured in decision sequence 227. The passing or failing of the steam pressure controller is determined by whether or not these values correspond to specification values within predetermined tolerances. When the target designated by the legend CONTINUE is touched in instruction sequence 231, the program proceeds to instruction 233 in which the message is displayed to the operator directing the operator to return the system to automatic. In response to this instruction, the operator should reset the boiler masters back to automatic operation and reactivate the steam pressure transmitter connected to the boiler not being tested. The program then returns to instruction sequence 124 to display the on-line verification menu.

Figure 16:
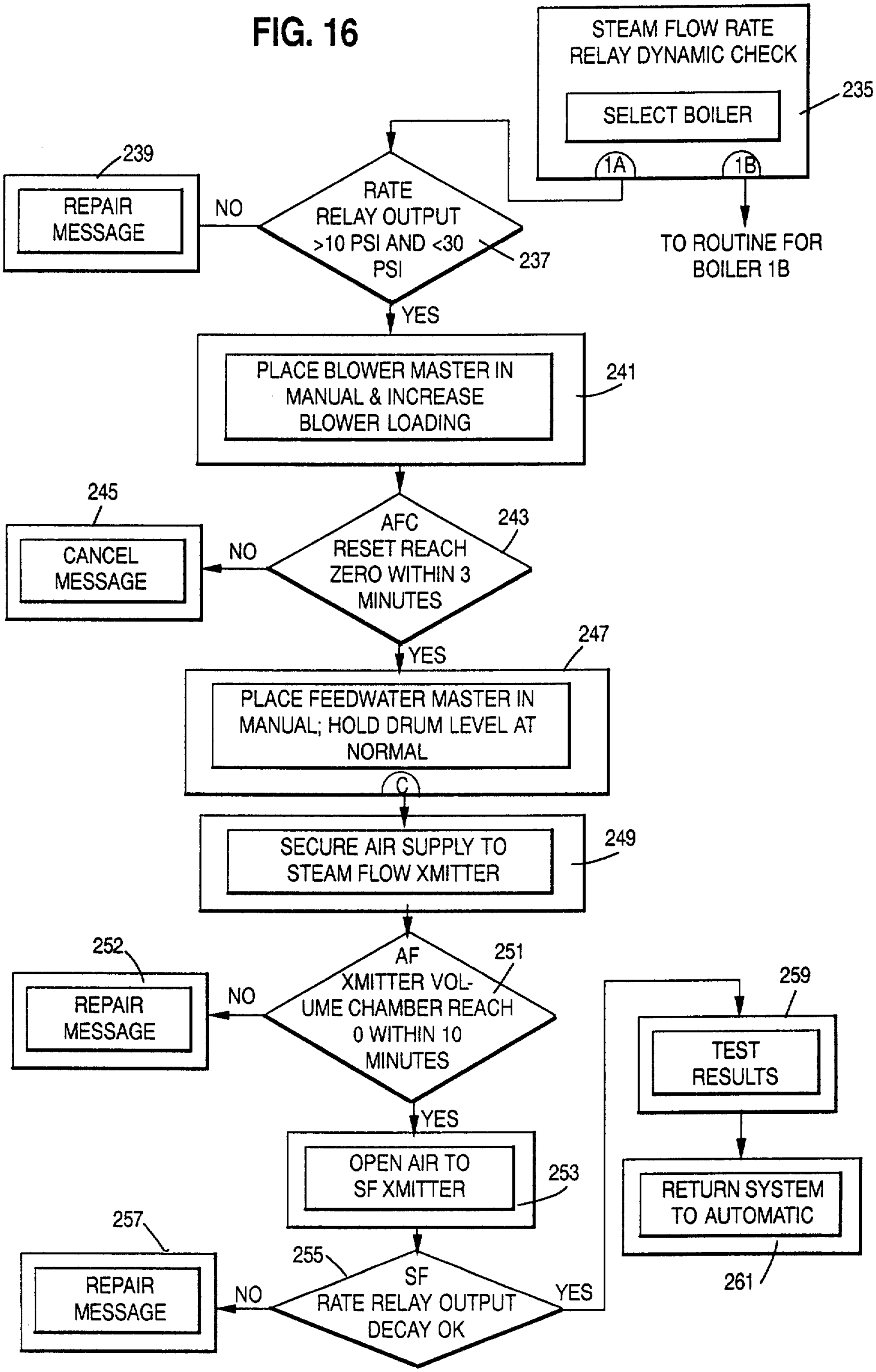

The flow chart of the routine 136 to carry out the on-line verification test on the steam flow rate relay 31 is illustrated in FIG. 16. As shown in FIG. 16, in this routine the program first enters instruction sequence 235 in which a message is displayed to the operator requesting him to select the boiler 1A or the boiler 1B. If the operator selects the boiler 1A by touching the target designated by the appropriate legend, the program enters into decision sequent 237 to begin the on-line verification test of the steam rate relay 31 in the pneumatic control system for the boiler 1A. If the operator touches the target designated by the legend 1B, the program enters into the first step of an identical series of instructions for the steam flow rate relay in the pneumatic control system for the boiler 1B. When the program has entered decision sequence 237, the program determInes whether the steam flow rate relay output pneumatic pressure is greater than 10 PSI and less than 30 PSI. If it is not within this range, the program aborts the test by branching to instruction 239, in which a message is displayed to the operator indicating the output pressure from the steam rate relay is outside the permissable limits and needs to be repaired. From instruction sequence 239 the program returns to instruction sequence 124 to display the on-line verification menu. If the output pressure from the rate relay 31 is between 10 and 30 PSI, the program proceeds into instruction 241 in which a message is displayed to the operator to place the forced draft blower master 32 in its manual state and to increase the blower loading by a specified amount. In response to this instruction, the operator should adjust the manual control on the blower master 31 in a direction to increase the operating rate of the blowers. In response to this manual control of the blower master 32, the pneumatic output pressure from the range modifier 33 should increase and thus cause an increase in the rate of operation of the blowers. When the output pressure from the range modifier 33, as indicated by the signal from the transducer 86, has increased by a small predetermined amount, the program advances from instruction sequence 241 into decision sequence 243, in which the program monitors the pneumatic pressure in the reset circuit 30 for the air flow controller 27 by means of the output signal from the transducer 82 for up to 3 minutes. If this pneumatic pressure does not drop to 0 within 3 minutes, the program aborts the test by branching into instruction sequence 245 in which a failure message is displayed to the operator indicating that the air flow controller reset circuit failed to drop to zero and that the air flow controller needs repair or readjustment. The program is advanced from instruction sequence 245 by the operator or touching a target labelled CONTINUE, whereupon the operator is reminded to return the system to automatic and the program returns to instruction sequence 124 to display the on-line verification menu. If the reset circuit 30 in the air flow controller 27 reaches 0 within three minutes in decision sequence 243, the program proceeds into instruction sequence 247, in which the operator is instructed by the display to place the feedwater master 49 in manual and to hold the water level in the drum at the normal level In response to this instruction, the operator should place the master 49 in its manually controlled state and by means of the manual control on the feedwater master 49, hold the drum level at the normal level. When the drum level has been adjusted to the normal level, the operator should touch the target designated by the legend CONTINUE on the display, whereupon the program will advance into instruction sequence 249, in which an instruction is displayed to the operator to secure the air supply to the steam flow transmitter 13. The securing of the air supply to the steam flow transmitter 13 will cause the output pressure from the steam flow transmitter to drop immediately, which will be detected by the transducer 74. In response to this drop in pressure as sensed by the transducer 74, the program advances into instruction sequence 251 in which the program waits for the pressure in the integrating circuit 53 to reach 0. If this pressure does not reach 0 within 10 minutes the program aborts the test by branching to instruction sequence 252, and displays a message explaining that the pressure in the integrating circuit did not go to. Touching the target designated CONTINUE in instruction sequence 259 will cause the operator to be reminded to return the system to automatic, whereupon the program will return to instruction sequence 12 to display online verification menu. If the pressure in the integrating circuit 53 reaches 0 within 10 minutes the routine advances into instruction sequence 253, in which the program displays a message to the operator directing him to open the air supply to the steam flow transmitter. In response to opening the air supply to the steam flow transmitter, the output pressure from the steam flow transmitter should rise. This rise in pressure is sensed by the transducer 74. In response to the rise in the output pressure as indicated by the transducer 74, the program advances into decision sequence 255, in which the output pneumatic pressure from the steam flow rate relay as indicated by the transducer 15 is monitored for 2 minutes. During this period, the output pressure from the steam flow rate relay should decay toward 0. If it does not reach a value equal to 30% of its original value within the 2 minute interval, the program aborts the test by branching from the decision sequence 255 to instruction sequence 257, in which a repair message is displayed to the operator indicating that the relay output did not decay properly and requires repair. Touching a target designated CONTINUE will return the program to the on line verification menu, after reminding the operator to return the system to automatic If the pneumatic output pressure from the rate relay decays to 30% of its value in the 2 minute interval, the program proceeds from decision sequence 255 into instruction sequence 259 in which the results of the test are displayed. These test results include the time it took in decision sequence 255 for the output pneumatic pressure from the rate relay to reach 30% of its initial output value when the air pressure to the steam flow transmitter was turned back on. Ideally, it should reach ⅓ of its initial value in 70 seconds. If it reaches the value within 70 seconds, plus or minus a predetermined margin of error, the display indicates that the steam flow rate relay passed the decay test and if the decay time to reach this value is not within the margin of error, the screen displays that the rate relay failed the decay test. The amount of time that it takes the relay to reach ⅓ of its initial value is also displayed.

After reading the test results displayed in instruction sequence 259, the operator should touch the touch sensitive target indicated by the legend CONTINUE, whereupon the program will advance into instruction sequence 261, in which the operator is instructed to return the control system to automatic. In response to this instruction, the operator should place the forced draft blower master 32 and feedwater master 49 back in automatic. Following instruction sequence 261, the program returns to instruction sequence 124 in which the on line verification menu is displayed.

Figure 17:
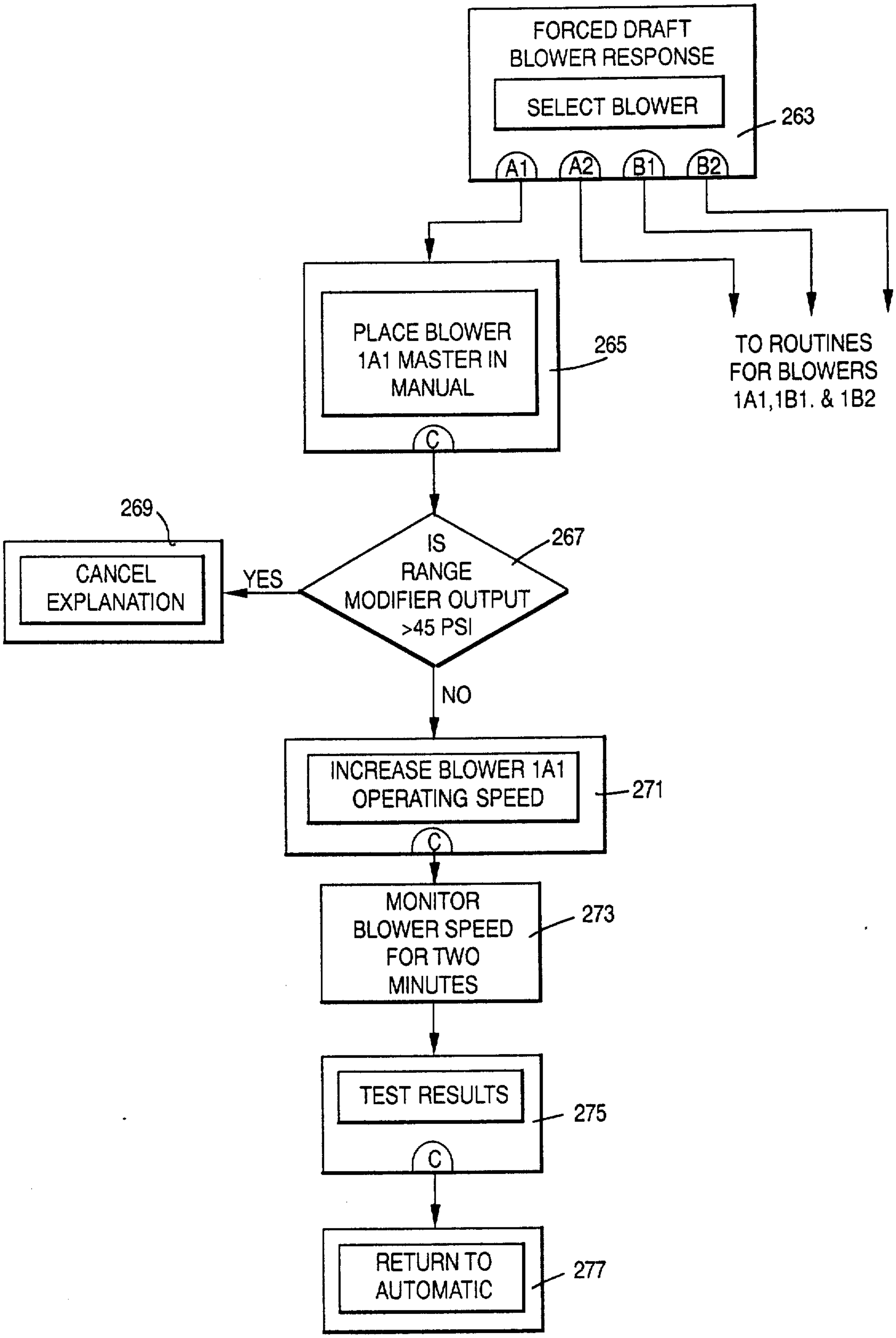

The details of the routine 137 for performing the on-line verification test on the forced draft blower response is illustrated by the flowchart shown in FIG. 17. Upon entering this routine, the program first performs instruction sequence 263 in which the operator is requested to select one of the two blowers for the boiler 1A or one of the blowers for boiler 1B by touching one of the four touch sensitive targets designated 1A1, 1A2, 1B1 and 1B2. The flow chart of FIG. 17 shows the details of the verification test for the blower 1A1 for the boiler 1A. The flowcharts for the remaining blowers, which will he entered by touching the appropriate touch sensitive targets in instruction sequence 263, are the same as for the blower 1A1. When the target designated 1A1 is touched by the operator, the program proceeds into instruction sequence 265, in which a message is displayed to the operator directing him to place the master 34 for the forced draft blower 1A1 in manual. When the operator has carried out this instruction, he then should touch a target designated by the legend CONTINUE which will cause the program to advance to decision sequence 267, in which it is determined whether the output pneumatic pressure from the range modifier 33 is greater than 45 PSI. If the pressure is greater than 45 PSI, the program branches into instruction 269 in which the test is cancelled. A message is displayed in this instruction sequence explaining that the test cannot be performed because the range modifier output is greater than 45 PSI. The touching of a target labelled CONTINUE in instruction sequence 269 will advance the program out of this instruction sequence to remind the operator to return the system to automatic. The program then returns to the on-line verification menu caused to be displayed by the instruction sequence 124. If the output pressure from the range modifier is not greater than 45 PSI, the program proceeds into instruction sequence 271 in which a message is displayed to the operator directing him to adjust the manual setting on the blower master 34 to increase the operating speed of the blower by a specified amount. After the operator carries out this instruction, in response to the speed of the blowers 1A1 starting to increase as sensed by the tachometer 93, the program will proceed into instruction sequence 273, in which the output speed of the blower 1A1 as indicated by the tachometer 93 is monitored for 2 minutes. After 2 minutes the program proceeds into instruction sequence 275 in which the test results are displayed. If in the 2 minute period the blower speed failed to increase properly in response to the increase of the setting of the blower master 34, or if the blower overshoots the setting of the master 34, a failure message will be displayed to the operator in the test results indicating that the blower failed the response test. If neither of these failures occur, the message displayed to the operator is that the forced draft blower passed the response test.

After the test results have been displayed to the operator, the operator should touch the touch sensitive target on the screen designated by the legend CONTINUE, whereupon the program will proceed to instruction sequence 277, in which the message is displayed to the operator to return the system to automatic. In response to this message the operator should place the blower master 34 back in automatic. Following instruction sequence 277, the program returns to instruction sequence 124 to display the on-line verification menu.

Figure 18:
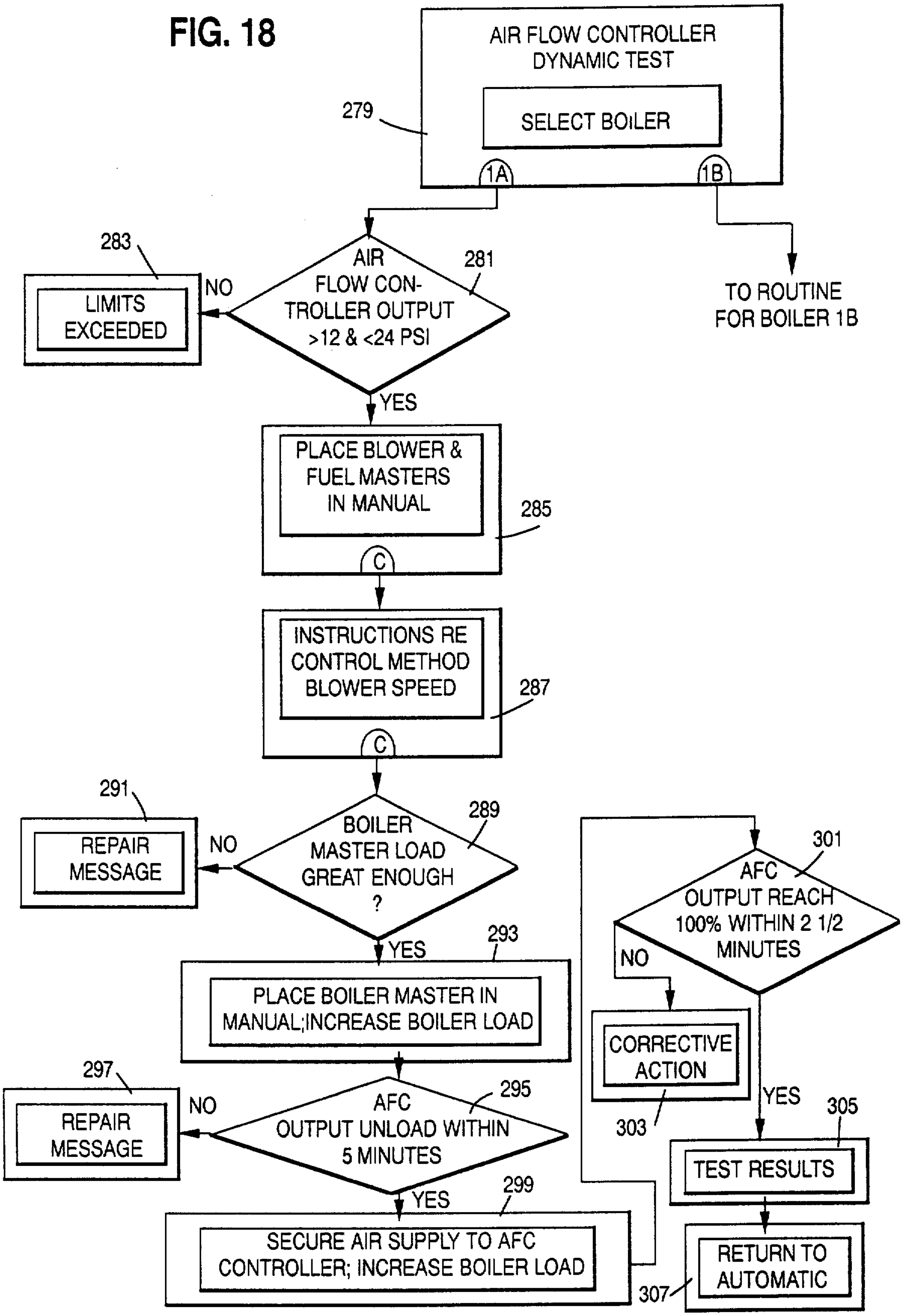

FIG. 18 is a flow chart illustrating details of the routine 138 for carrying out the on-line verification test on the air flow controller. As shown in FIG. 18, in this routine the program first enters instruction sequence 279 in which a message is displayed to the operator asking him to select the boiler 1A or the boiler 1B for the test. Upon the operator touching the target 1A, the program will start into the program for the boiler 1A by entering decision sequence 281. If the operator touches the target designed 1B, the program enters into the corresponding program for the boiler 1*b*. In decision sequence 281, the program determines whether the pneumatic output pressure from the air flow controller as indicated by the transducer 83 is between 12 and 24 PSI. If it is not within this range, the program cancels the test by branching to instruction sequence 283 in which a message is displayed to the operator explaining that the limits for the output pressure for the air flow controller are exceeded and that these limits are between 12 and 24 PSI. From instruction sequence 283, the program returns to display the on-line verification menu. If in decision sequence 281, it is determined that the pneumatic output pressure from the air flow controller 27 is in the specified range, the program proceeds into instruction sequence 285, in which a message is displayed to the operator to place the blower master 32 and the fuel oil master 39 in their manually controlled operating states. When the operator has carried out this instruction and then touched a target on the display screen indicated by the legend CONTINUE, the program will advance into instruction sequence 287, in which the operator is instructed not to change the forced draft blower speeds during the test. After receiving this instruction, the operator should touch the target designated by the legend CONTINUE on the display screen, whereupon the program will enter decision sequence 289 in which it is determined whether the pneumatic output pressure from the boiler master is sufficiently great for the rest of the test. If the boiler master output pressure is not high enough, the program cancels the test by branching branches to instruction 291 in which an explanation message is displayed to the operator indicating that the output from the boiler master must be at least a predetermined value before the test can be performed. Touching an appropriately labelled target in instruction sequence 291 will cause the operator to be reminded to return the system to automatic, whereupon the program will return to the on-line verification menu. If the boiler pressure is determined to be sufficient in decision sequence 289, the program proceeds into instruction sequence 293, in which instructions are displayed to the operator to secure the air supply to the air flow controller 27, to place the boiler master 25 in its manually controlled state, and to decrease the output pressure of the boiler master to 22% of its original value. The program determines when the operator has carried out this instruction by the signals received from the transducer 80 and then advances into decision sequence 295, in which the output pressure from the air flow controller 27, as indicated by the transducer 83, is monitored for up to 5 minutes. Within 5 minutes the output pressure from the air flow controller should drop to 0. If it does not, the program aborts the test by branching from decision sequence 295 into instruction sequence 297 and displays a message to the operator that the air flow controller needs calibration or repair. Following instruction sequence 297, in response to the operator touching a target labelled CONTINUE, the operator is reminded to return the system to automatic and the program returns to instruction sequence 124 to display the on-line verification menu. If the output from the air flow controller 27 does drop to 0 within 5 minutes, the program proceeds from decision sequence 295 into instruction sequence 299, in which an instruction is displayed to the operator directing him to restore the air supply to the air flow controller 31 and to increase the boiler master output pressure by a predetermined amount. In response to this instruction, the operator should turn on the air supply to the air flow controller 27 and increase the manual setting on the boiler master 25 to cause the steam pressure to increase. When the output pressure from the boiler master increases, the program advances into decision sequence 301, in which the pneumatic output pressure of the air flow controller 27 is monitored for up to 2½ minutes to determine whether the output pressure reaches 100% within this time period. If the output from the air flow controller does not reach 100% within 2½ minutes, the program test is aborted by the program branching to instruction sequence 303. In this instruction sequence a message is displayed to the operator that the output from the air flow controller did not reach 100% and needs to be repaired. The operator should then touch an appropriately labelled target, whereupon he will be reminded to return the system to automatic. The program then returns to instruction sequence 124 to display the on-line verification menu. If the output from the air flow controller does reach 100% within 2½ minutes, the program proceeds into instruction sequence 305 in which the test results are displayed indicating whether or not the air flow controller passed or failed the tests. In response to the operator touching the target designated by the legend CONTINUE in instruction sequence 305, the program advances to instruction sequence 307 in which the operator is instructed by a displayed message to return the system to automatic. The program then returns to instruction sequence 110 to display the main page.

Figure 19:
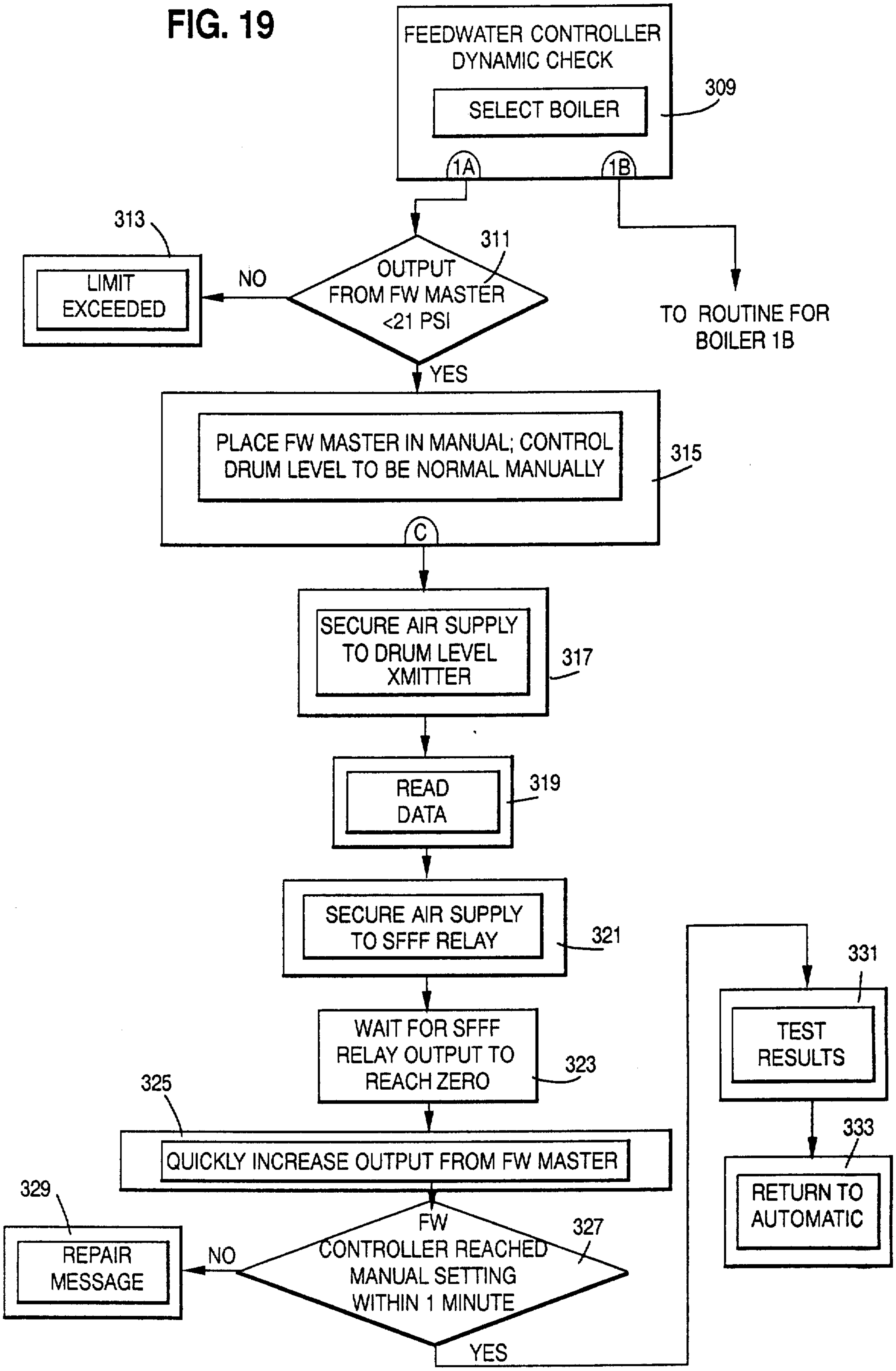

The flow chart illustrating the details of the program routine 139 to carry out the on-line verification test for a dynamic check on the feedwater controller is illustrated in FIG. 19. In this routine the program first enters instruction sequence 309, in which the program displays an instruction to the operator to select the boiler 1A or the boiler 1B for the test. The verification test for the two boilers are the same so only the flow chart for the boiler 1A is illustrated in detail. If the operator touches the touch sensitive target designated by the legend 1A, the program will enter decision sequence 311, which is the initial part of the program to carry out the test on the boiler 1A. If the operator touches the target designated by the legend 1B, the program enters into the series of instructions to carry out the on-line verification test for the boiler 1B. Upon entering the decision sequence 311, the program first determines whether the output from the feedwater master 49 is less than 21 PSI, which is 35% of its maximum value. In order for the online verification test to be carried out, this output pressure must be less than 21 PSI. If it is not less than 21 PSI, the program branches into instruction sequence 313 in which a message is displayed to the operator indicating that the limit for the output pressure for the feedwater master has been exceeded and that for the test to be carried out, this pressure must be less than 21 PSI. At this point the test is aborted and the program returns to instruction sequence 124 to display the on-line verification menu If the output pressure from the feedwater master is less than 21 PSI, the program proceeds into instruction sequence 315, in which instructions are displayed to the operator to place the feedwater master 49 in its manually controlled state and to control the water level in the drum manually to be at the normal level. After carrying out these instructions, the operator should touch the target indicated by the legend CONTINUE displayed on the screen, whereupon the program will advance into instruction sequence 317, in which an instruction is displayed to the operator to secure the air supply to the drum level transmitter 15. When the operator has carried out this instruction, the output pressure from the drum level transmitter 15 should drop to 0. In response to the pressure dropping as sensed by transducer 76, the program enters into instruction sequence 319 in which output data from the transducers 71–97 are read. Then the program advances into instruction sequence 321, in which instructions are displayed to the operator to secure the air supply to the steam flow rate relay 31. When the air supply has been secured to the steam flow rate relay the output pressure from the steam flow rate relay 31 will begin to drop. This drop in pressure will be detected by transducer 85 and will cause the program to advance into instruction sequence 323 in which the program waits for the output pressure from the steam flow rate relay to reach 0. Upon the output pressure from the steam flow rate relay reaching 0, the program advances into instruction sequence 325, in which an instruction is displayed to the operator to quickly increase the rate of feedwater flow. In response to this instruction, the operator should adjust the manual setting on the feedwater master 49 to cause a rapid increase in the rate of feedwater flow. In response to this action, the output pressure from the feedwater master 49 should increase rapidly, which rapid increase is sensed by the transducer 92. The program in response to the increase in pressure as sensed by the transducer, advances into decision sequence 327 in which the output pressure from the feedwater controller 47, as indicated by the transducer 91, is monitored for 1 minute. In this time interval, this output pressure should reach the output pressure from the feedwater master 49 as sensed by the transducer 92. If it does not, the program terminates the test by branching from decision sequence 327 into instruction sequence 329 in which a message is displayed to the operator indicating that the feedwater controller requires repair or recalibration. The program is advanced out of instruction sequence 329 by the operator touching an appropriately labelled target, whereupon the operator will be reminded to return the system to automatic and the program returns to display the on line verification menu. If the output pressure from the feedwater controller 47 does reach the output pressure from the master 49, the program advances into instruction sequence 331, in which the results of the test are displayed. These test results will indicate how long it took the output pressure from the feedwater controller to reach the output pressure from the master 49 and whether this time interval is satisfactory or unsatisfactory by a pass or fail message. Following the display of the test results in instruction sequence 331, the program is advanced to instruction sequence 333 by the operator touching a target, whereupon the operator is instructed to return the system to automatic. In response to this instruction, the operator should place the feedwater master 49 back to its automatic state, open the air supply to the drum level transmitter and open the air supply to the steam flow rate relay. Following instruction sequence 333, the program returns to instruction sequence 124 to display the on-line verification menu.

Figure 20:
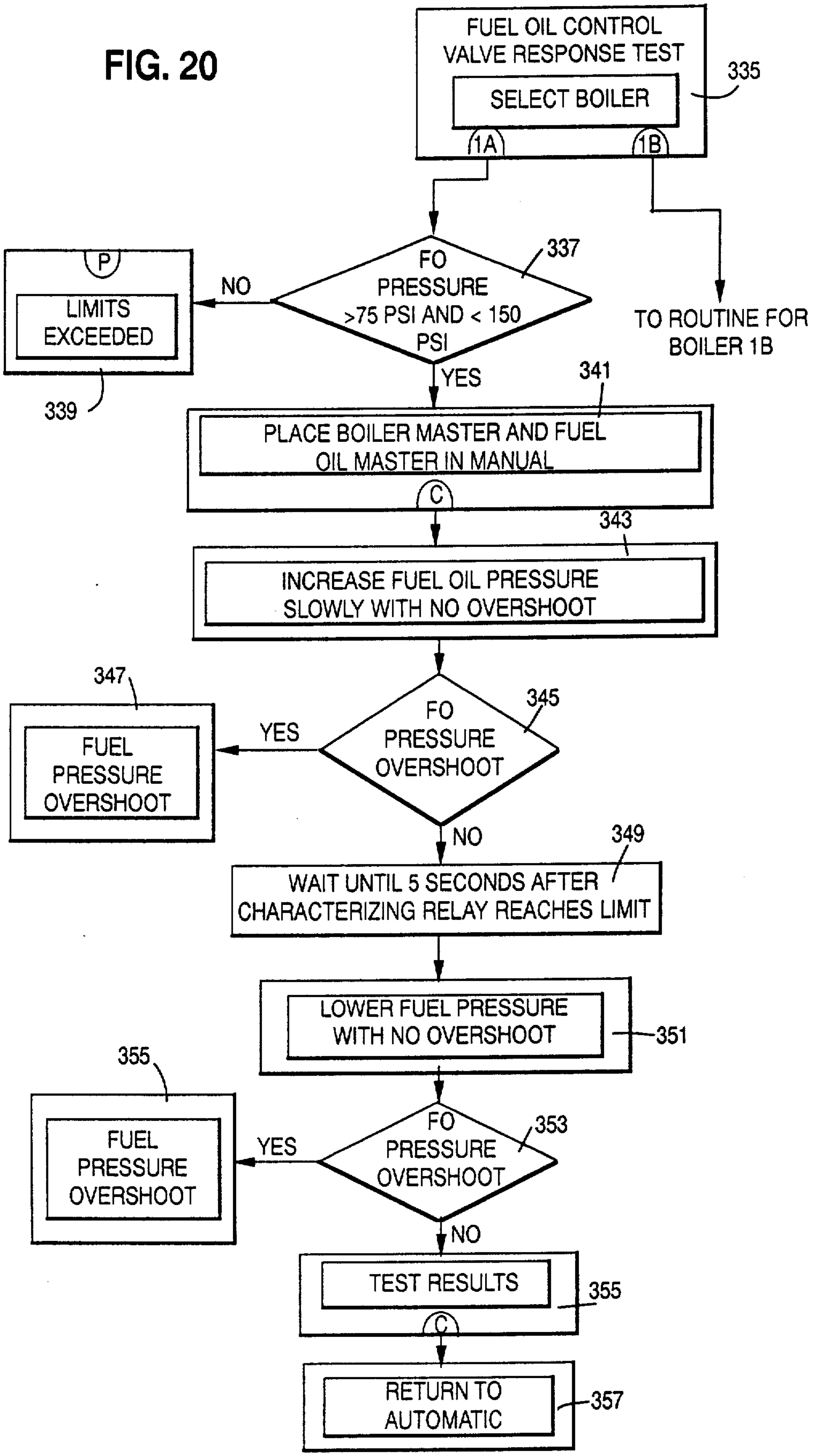

The flow chart illustrating the program routine 140 to carry out the on-line verification test for the fuel oil control valve response is illustrated in FIG. 20. The primary purpose of this test is to determine if the fuel oil valve is sticking. Small particles can contaminate the valve and cause it to stick and then jump rather than respond smoothly. As shown in FIG. 20, in this routine, first enters instruction sequence 335, in which the operator receives a displayed message to select boiler 1A or 1B. If the operator touches a target designated by the legend 1A on the screen, the program will enter into decision sequence 337 to commence the test of the fuel oil valve response for the boiler 1A. If the operator touches the target designated by the legend 1B, the program will enter into a corresponding sequence for the boiler 1B. In decision sequence 337, the program determines whether the fuel oil pressure is between 75 PSI and 150 PSI. If it is not, the program branches into instruction sequence 339 in which a message is displayed to the operator that the limits for the fuel pressure have been exceeded and that the fuel pressure must be between 75 PSI and 150 PSI for the on-line verification test to proceed. The operator can bring the fuel pressure within the pressure limits by adjusting the steam throttle. When the fuel pressure has been brought within the prescribed limits, the operator should touch a target designated by the legend PROCEED, whereupon the program will return to decision sequence 337. If the fuel oil pressure is between 75 PSI and 150 PSI in decision sequence 375, the program proceeds into instruction sequence 341, in which the operator is instructed to place the boiler master 25 and the fuel oil master 39 in their manual operating states. When the operator has carried out these instructions and has touched the target designated CONTINUE the program advances into instruction sequence 343, in which it displays a direction to the operator to increase the fuel oil pressure slowly with no overshoot to a specified value amounting to about an 8 PSI change in the output pressure of the characterizing relay. While the operator is performing this junction, the computer will monitor the output pressures of the characterizing relay 41 as indicated by the transducer 88 and the fuel oil control valve 43 as indicated by the transducer 96. When the fuel oil pressure increases, as indicated by the output of the transducer 96, the program advances into instruction sequence 345, in which the program determines whether the output pressure of the fuel oil control valve 43 overshot the specified value in response to the operator's increasing the fuel oil pressure in accordance with the displayed instruction to the operator. If the fuel oil pressure overshot the specified value, the program branches to instruction 347 causing the test to be cancelled. In this instruction sequence, a message is displayed to the operator indicating that the fuel pressure overshot its maximum value. The overshoot may have resulted either from the failure of the fuel valve itself or the failure of the operator to increase the fuel pressure slowly enough. The program is advanced out of instruction sequence 347 by the operator touching a target labelled CONTINUE, whereupon the operator is reminded to return the system to automatic. The program then returns to the instruction sequence 124 to display the on-line verification menu. If the output pressure from the fuel oil valve 43 does not overshoot the specified value, the program advances into instruction sequence 347, in which the program monitors the output pressure of the characterizing relay 41 as indicated by the transducer 88 and waits for 5 seconds after the output from the characterizing relay reaches its limit. Following this 5 second interval, the program advances into instruction sequence 351, in which the operator is instructed to lower the fuel pressure output with no overshoot. When the message has been displayed in instruction sequence 351, the program advances into instruction sequence 353 in which the output pressure from the fuel oil control valve 43 as indicated by the transducer 96 is monitored and it is determined whether or not the output pressure from the fuel oil control valve drops to the specified value without any overshoot. If the output pressure from the fuel oil control valve overshoots the specified value, the program branches to instruction sequence 355 to cancel the test. In instruction sequence 355, the program displays a message to the operator that the fuel pressure overshot. The operator advances the program out of instruction sequence 355 by touching a target labelled CONTINUE, whereupon the operator will be reminded to return the system to automatic. The program then returns to instruction sequence 124 to display the on-line verification menu. In decision sequence 353, the program also monitors the output pressure of the characterizing relay 41 as indicated by the transducer 88 and waits until 5 seconds after the output pressure from the characterizing relay 41 reaches its minimum value. At that time, if their was no branching due to overshoot, the program advances into instruction sequence 355 in which the test results are displayed. If the fuel oil valve output pressure rises and falls properly in response to the operator's manual control in instruction sequences 343 and 351, as indicated by the output of the transducer 96, the test results will indicate that the fuel oil control valve passed both the increasing and decreasing part of the test. If it ails to increase or decrease smoothly with the output pressure from the characterizing relay, the test results will include a message to the operator that the fuel oil control valve needs to be repaired. Following instruction sequence 355, the operator can advance the program into instruction sequence 357 by touching the target designated by the legend CONTINUE whereupon the program will advance into instruction sequence 357 and display a message to the operator directing him to return the system to automatic. In response to this instruction, the operator should place a boiler master 25 and the fuel oil master 39 back in their automatic states. Following instruction sequence 357, the program returns to instruction sequence 124 to display the main on-line verification menu.

Figures 21, 23:
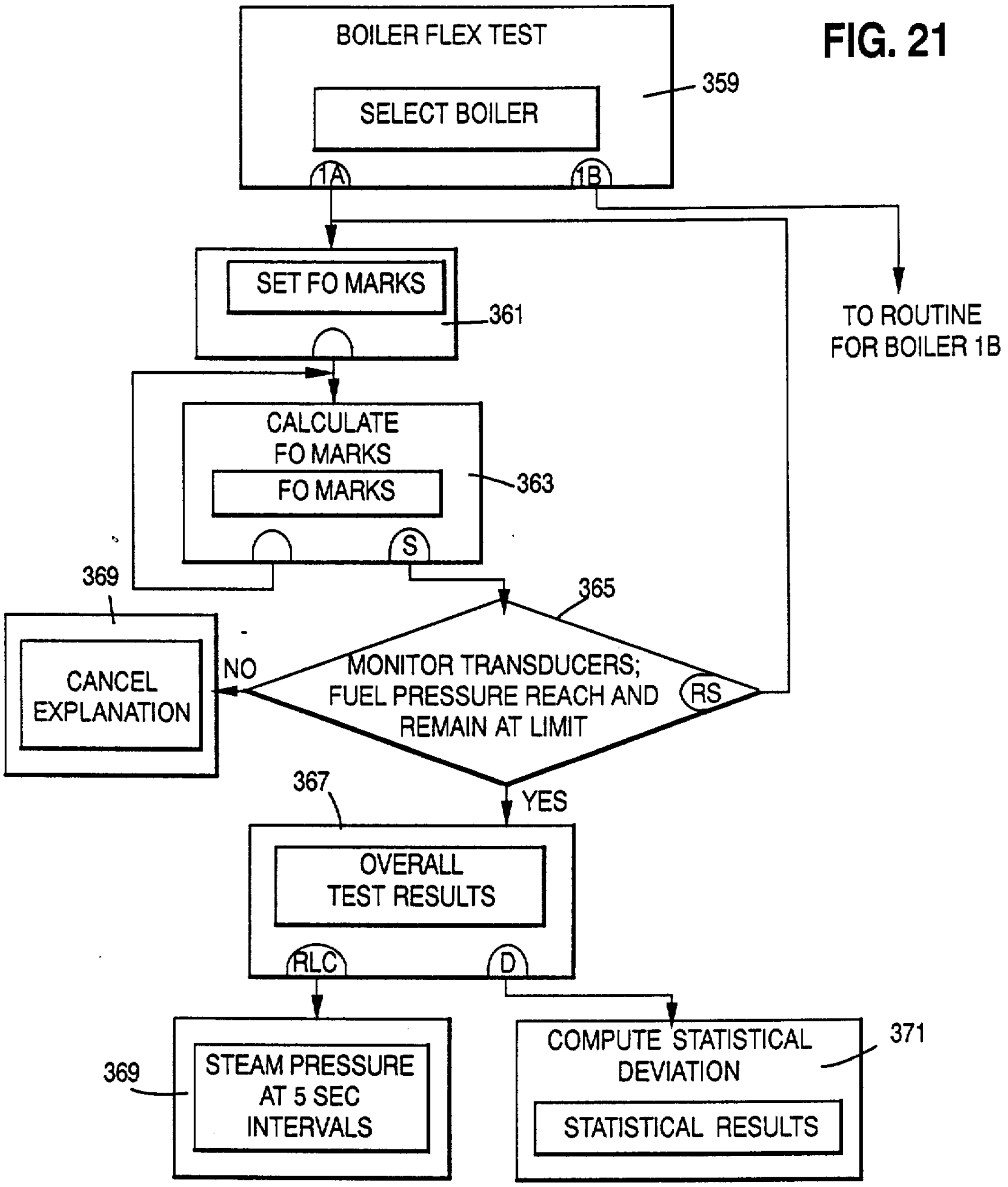

The flow chart for carrying out the boiler flex test 128 is shown in FIG. 21. This routine, as explained above, is entered into by touching an appropriately designated target from the menu displayed in the main page by instruction sequence 110. As shown in FIG. 21, the operator is first instructed to select the boiler 1A or 1B for the flex test, which the operator does by touching an appropriately designated touch sensitive target displayed on the screen. The flow charts for the two boilers are the same and only the flow chart for the boiler 1A is displayed. If the operator touches the target designated 1A, the program proceeds into instruction sequence 361 to commence the flex test for the boiler 1A. If the operator touches the corresponding target for the boiler 1B, the program starts a corresponding set of instructions for the boiler 1B. In instruction sequence 361, the program displays the plant line up for the test indicating that the boiler 1A control system should be in automatic and the two forced draft blowers and the four burners of the boiler should be in service. Also, the drum pressure and the fuel oil pressure are displayed to the operator. In addition to this information, a touch sensitive target is provided which is designated by the legend SET F.O. MARKS, meaning to set the fuel oil marks for the boiler flexibility test. When the operator touches this target, the computer calculates the upper and lower fuel oil pressure marks for the test. The upper and lower fuel oil marks are the fuel oil pressures between which the fuel oil pressure is varied during the flex test. If the current fuel oil pressure is a low pressure then the lower fuel oil mark will be the fuel oil pressure at the start of the test and the upper fuel oil mark is calculated to be a predetermined pressure above the lower fuel oil mark. Conversely if the starting pressure is a high pressure, then the current pressure will be the upper fuel oil mark and the lower fuel oil mark is calculated to be a predetermined fuel oil pressure below the current fuel oil mark. The calculated values of these fuel oil marks are displayed to the operator in instruction sequence 363. Also, displayed to an operator is a legend START TEST designating another touch sensitive target, which when touched by the operator will cause the program to advance into instruction sequence 365. This target should be touched at the time the operator is ready to begin the test. If the operator notIces that for some reason, the fuel oil pressure has changed before the test is begun, instead of touching the target designated by the legend START TEST, he should touch the target designated by the legend SET F.O. MARKS, which will still be displayed. In response to the operator touching this target, the program will repeat instruction sequence 363 and recalculate the fuel oil marks. When the program has entered instruction sequence 365, the operator should cause the fuel oil pressure to change from the starting fuel oil pressure to the final fuel oil pressure as indicated by the calculated final fuel oil pressure mark by opening or closing the steam throttle. As the fuel oil pressure is being ramped in this manner, with the pneumatic control system in FIG. 1 all in automatic, the outputs from all of the transducers 71 through 97 are read 10 times a second and stored. While this ramping of the fuel oil pressure to the final fuel oil mark is carried out, the screen will display to the operator whether the boiler flexibility test is an up ramp or a down ramp, that is whether the pressure is being increased or decreased to the final fuel oil mark is carried out, the time elapsed since the flex test started, that is the time elapsed since the program entered instruction sequence 365, the current boiler pressure, the current drum level, and the fuel oil pressure. The upper and lower fuel oil pressure marks are also displayed to the operator. In addition, a legend RE-START TEST designates a target, which if touched by the operator will return the program to instruction sequence 361 to start the test over. The test ends and the program advances to instruction sequence 367 when the fuel oil pressure reaches the mark to which it is being ramped and then remains at this mark for a period of 2 minutes, whereupon the program advances into instruction sequence 367 to display the test results. If the program has not advanced into instruction sequence 367 as a result of the fuel oil pressure reaching a steady state value at the upper limit within 6 minutes from the start of the test determined by when the program entered decision sequence 365, the program cancels the test by branching into instruction sequence 369, in which a message is displayed to the operator explaining the reason for the cancellation of the test, whereupon the program returns to instruction sequence 110 to display the main page.

An example of the test result displayed by the program in instruction sequence 367 is shown in FIG. 22. As shown in this Figure, the test results are separated into an upper half and a lower half separated by a dashed line across the screen. Above the dashed line, the results displayed are for the transient or ramp part of the test. The first line indicates that the test was for the boiler 1A and indicates the results for the test as a whole as being satisfactory or unsatisfactory. The second line indicates the time that the fuel pressure was being ramped from its starting mark to the final mark. The third and fourth lines indicate the minimum drum pressure and the maximum drum water level, during the ramping of the fuel oil pressure. These values, minimum drum pressure and maximum drum level are given for an up ramp. For a down ramp from a starting high fuel oil pressure to a low oil pressure, the drum pressure given would be the maximum drum pressure and the drum level given would be the minimum level. If either the drum pressure or the drum level exceeded predetermined limit values during the ramping of the fuel pressure, this fact would be indicated on the display by a set of blinking double arrows adjacent to the corresponding part of the display to show which parameter exceeded its limits. The bottom line of the upper half of the display provides a pass/fail indication for the transient portion of the test. This line will pass or fail, depending upon whether the drum pressure or drum level exceeded the predetermined limit values during the transient portion of the test. The line just above the pass/fail result is a legend RAMP LOAD CHANGE, which designates an adjacent touch sensitive target used to cause the program to advance to the next instruction sequence in the program to be explained below.

Below the dashed line as shown in FIG. 22, are the results of the test during the settling part of the test, that is the results after the fuel oil pressure reaches the fuel oil pressure to which it is being ramped and during the subsequent 2 minute interval in which the system is allowed to reach a steady state condition. In this portion of the display, the maximum drum pressure and the maximum drum level deviations from normal are displayed during the settling portion of the test. In addition, the maximum difference in the operating speeds of the two blowers, 1A1 and 1A2 is also displayed. The last line in this part of the display indicates whether the system passed or failed the steady state part of the test.

If the drum pressure level or the parallelness of the forced draft blowers exceeded predetermined limits, this fact would be indicated by blinking double arrows designating the failing value. In addition, the message FAILED would be displayed in the last line of the lower part of the display.

When the test results of FIG. 22 are being displayed on the touch sensitive display screen 103 by instruction sequence 367, and the operator touches the target adjacent the legend RAMP LOAD CHANGE, the program will proceed into instruction sequence 369, in which the pneumatic output pressures of the steam flow transmitter 13 as indicated by the transducer are displayed at 5 second intervals of the ramp and settling periods. These pneumatic pressure values during the first 45 seconds of the ramp, provide an indication of how smooth the ramp was during the test. Instruction sequence 367 also displays on the screen is the legend DIAG, which designates a touch sensitive target. In response to touching this target, the program will proceed into instruction sequence 371 in which a statistical analysis is performed on the pneumatic output pressures, which were read during the test at 10th of a second intervals from each of the major components of the pneumatic control from the boiler under test. This statistical analysis comprises taking each value read at each 10th of a second and comparing with a mathematical model precalculated for the component at each 10th of a second interval from the input values generated by the actual system. Thus, at each 10th of a second interval during the flex test, the mathematical model will indicate an ideal output pressure for the steam pressure controller. This value is determined from the input pressure applied to the inverting input, the known pressure applied to the positive input, and the gain characteristic for the steam pressure controller, taking into account the effect of the reset circuit, as explained above in connection with the continuous on-line verification test. The output pressures of the mathematical model for the steam pressure controller 21 at each 10th of a second interval is compared with the actual pressure as read by the transducer 79. From these comparisons, a statistical correlation for the steam pressure controller is determined resulting in a calculated figure of merit ranging from 0 to 1. This figure of merit is the correlation coefficient between the pneumatic output values from the steam pressure controller read at every 10th of a second during the test with the corresponding values of the mathematical model. The same correlation coefficient as a figure of merit is computed for each of the major components in the pneumatic control system for the boiler under test and displayed to the operator in instruction sequence 371. An example of the display to the operator is shown in FIG. 23. As shown in FIG. 23, each of the pneumatic controllers 21, 27, 31, 33, 45 and 47 and the relays 29 and 41 are listed in the left column and the figure of merit or correlation coefficient computed, as described above is listed under the heading MERIT. A ranking of condition is listed under the heading RANKING. The ranking may be SAT for satisfactory, MARG for marginal or unsat for unsatisfactory. The rankings are determined by comparing the value of statistical merit with preset values. For example, for the steam pressure controller, the air flow controller, and the feedwater flow controller, rankings of 0.80 or greater are satisfactory, 0.60 to 0.80 are marginal and less than 0.6 are unsatisfactory. For the remaining components, figures of merit of 0.90 or greater are satisfactory, 0.8 to 0.9 are marginal, and less than 0.8 are unsatisfactory.

Touching the target labelled CONTINUE will display the results for additional components in the pneumatic system so that the operator may observe the figure of merit for each of the major components of the pneumatic control system. The operator exits from the test and returns to the main page by touching a target labelled EXIT displayed on the last page of the statistical results by the instruction sequence 371. The operator can return to the main page from instruction sequence 367 or instruction sequence 369 in a similar manner, that is by touching a target on the display screen labelled EXIT. This option of returning to the main display screen is also given to the operator during the middle of the flex test by touching a target labelled QUIT at which point the test will be aborted.

By the system as described above, the operator is given a very effective and convenient system for guiding the operator through various tests to check on the performance of the pneumatic boiler control system and to determine which components of the system are not operating satisfactory and need repair. Because of the automation and guidance provided by the system of the invention, the testing and diagnosis of the pneumatic system is carried out much more quickly and conveniently than was possible prior to the invention. While the system has been described specifically for a pneumatic control system for boilers it will be apparent that the system is applicable to other control systems such as pneumatic control systems applied in robotics, or electrical servomechanisms employed in diverse applications.

The above description is of a preferred embodiment of the invention and many other modifications may be made thereto without departing from the spirit and scope of the invention, which is defined in the appended claims.

What is claimed is:

1. A system for monitoring an analog automatic control system, wherein said analog automatic control system controls a controlled system and includes means responsive to a plurality of parameters of said controlled system to control a plurality of devices in said controlled system, which devices affect the values of said parameters, said system for monitoring comprising:

a multiplicity of transducers sensing different analog signal values in said analog control system and to convert said analog signal values to digital signal values, a computer connected to receive said digital signal values, a display connected to said computer, said computer comprising means selectively operable to display different sequences of instructions to an operator, each sequence directing the operator to perform a series of manual steps to vary the operation of said automatic control system, said computer further comprising means to receive digital signals from said transducers in response to the operator performing any one of the series of manual steps, to compare the digital signals with standard values, and to indicate the results of such comparison to the operator.

2. A system as recited in claim 1, wherein said controlled system is a steam boiler and said analog control system is a pneumatic control system controlling the operation of said steam boiler, said transducers comprising means to sense pneumatic signals in said pneumatic control system and convert said pneumatic signal to digital values.

3. A system as recited in claim 1, wherein said analog automatic control system includes automatic/manual station at which the value of an analog output signal is controlled to equal a manually set signal in one mode or to automatically follow an input signal in another mode, and wherein at least one of said sequences of instructions includes an instruction to set said automatic/manual station to its manual mode of operation and to adjust the analog output signal to different values in sequence.

4. A system as recited in claim 1, wherein said step of comparing data received from said transducers with standard values comprises comparing the time it takes the digital signal from one of said transducer to reach a predetermined value and comparing said time interval with a standard time interval.

5. A system for monitoring and testing an automatic analog control system wherein said automatic analog control system controls a controlled system and includes means responsive to a plurality of parameters of said controlled system to control a plurality of devices in said controlled system, said devices affecting the values of said parameters, said system for monitoring comprising:

a multiplicity of transducers connected to said analog control system to generate digital values representing analog signals in said analog control system, and a computer connected to receive said digital values at periodic intervals, said computer comprising means to compute mathematically derived values at said periodic intervals for a first set of said analog signals, said means computing said mathematically derived values from the digital values received from said transducers and representing a second set of said analog signals, and said computer further comprising means to compute a statistical correlation coefficient for each analog signal of said first set between the digital values representing each of said analog signals of said first set and the corresponding mathematically derived values.

6. A system as recited in claim 5, wherein controlled system is a boiler and said automatic control system is a pneumatic system automatically controlling the operation of said boiler.

7. A method of testing an automatic control system for a steam boiler having a variable steam pressure and water level in said boiler and variable rates of steam flow from said boiler and feedwater flow to said boiler, wherein said automatic system includes means responsive to the steam pressure in said boiler, the rate of steam flow from said boiler, the rate of feedwater flow to said boiler and the water level in said boiler to automatically control a valve controlling fuel pressure to a burner firing said boiler and a valve controlling the rate of feedwater flow to said boiler, said automatic control system further including a throttle to adjust said automatic control system, said method comprising adjusting said throttle to cause said automatic control system to change said fuel pressure over a period of time from one value to another, reading out values of a first set of analog signals in said control system at periodic intervals during said period of time, computing mathematically derived values for the analog signals of said first set from a second set of analog control signals in said analog control system, and for each analog signal of said first set computing a statistical correlation coefficient between the signal values read out at periodic intervals during said period of time with the corresponding mathematically derived values at said period intervals during said period of time.

* * * * *